(12) United States Patent
Yan et al.

(10) Patent No.: US 10,566,614 B2
(45) Date of Patent: Feb. 18, 2020

(54) RARE EARTH BASED HYDROGEN STORAGE ALLOY AND APPLICATION THEREOF

(71) Applicants: Baotou Research Institute of Rare Earths, Baotou, Neimenggu (CN); National Engineering Research Centre of Rare Earth Metallurgy and Function Materials, Baotou, Neimenggu (CN); Tianjin Baogang Research Institute of Rare Earths Co., Ltd., Tianjin (CN)

(72) Inventors: Huizhong Yan, Baotou (CN); Li Wang, Baotou (CN); Wei Xiong, Baotou (CN); Baoquan Li, Baotou (CN); Jin Li, Baotou (CN)

(73) Assignees: Baotou Research Institute of Rare Earths, Baotou, Neimenggu (CN); National Engineering Research Centre of Rare Earth Metallurgy and Function Materials, Baotou, Neimenggu (CN); Tianjin Baogang Research Institute of Rare Earths Co., Ltd., Tianjin (CN)

( * ) Notice: Subject to any disclaimer, the term of this patent is extended or adjusted under 35 U.S.C. 154(b) by 346 days.

(21) Appl. No.: 15/507,133

(22) PCT Filed: Aug. 27, 2015

(86) PCT No.: PCT/CN2015/088274
§ 371 (c)(1),
(2) Date: Feb. 27, 2017

(87) PCT Pub. No.: WO2016/029861
PCT Pub. Date: Mar. 3, 2016

(65) Prior Publication Data
US 2017/0288217 A1    Oct. 5, 2017

(30) Foreign Application Priority Data

Aug. 28, 2014  (CN) .......................... 2014 1 0427179
Aug. 28, 2014  (CN) .......................... 2014 1 0427199
(Continued)

(51) Int. Cl.
*H01M 4/38*    (2006.01)
*C22C 19/03*   (2006.01)
(Continued)

(52) U.S. Cl.
CPC ............ *H01M 4/383* (2013.01); *C22C 1/023* (2013.01); *C22C 19/007* (2013.01); *C22C 19/03* (2013.01);
(Continued)

(58) Field of Classification Search
None
See application file for complete search history.

(56) References Cited

FOREIGN PATENT DOCUMENTS

CN    101170173 A    4/2008
CN    101355155 A    1/2009
(Continued)

OTHER PUBLICATIONS

State Intellectual Property Office of the People's Republic of China, International Search Report issued in International Patent Application No. PCT/CN2015/088274 (dated Dec. 4, 2015) 6 pp.
(Continued)

*Primary Examiner* — Anita Nassiri-Motlagh
(74) *Attorney, Agent, or Firm* — Leydig, Voit & Mayer, Ltd.

(57) ABSTRACT

The invention relates to a rare earth based hydrogen storage alloy, represented by the general formula (I):

$$RE_xY_yNi_{z-a-b-c}Mn_aAl_bM_cZr_ATi_B \quad (I)$$

(Continued)

wherein RE denotes one or more element(s) selected from La, Ce, Pr, Nd, Sm, Gd; M denotes one or more element(s) selected from Cu, Fe, Co, Sn, V, W. The alloy has favorable pressure-composition-temperature characteristic, high hydrogen storage capacity, high electrochemical capacity. The alloy doesn't contain magnesium element, and the preparation process of the alloy is easy and safe.

23 Claims, 16 Drawing Sheets

(30) Foreign Application Priority Data

| Aug. 28, 2014 | (CN) | ......................... 2014 1 0427220 |
|---|---|---|
| Aug. 28, 2014 | (CN) | ......................... 2014 1 0427259 |
| Aug. 28, 2014 | (CN) | ......................... 2014 1 0427281 |
| Aug. 28, 2014 | (CN) | ......................... 2014 1 0429187 |
| Aug. 28, 2014 | (CN) | ......................... 2014 1 0429202 |

(51) Int. Cl.
*C22C 19/00* (2006.01)
*C22C 1/02* (2006.01)
*C22C 28/00* (2006.01)
*H01M 10/34* (2006.01)
*H01M 4/02* (2006.01)

(52) U.S. Cl.
CPC ........... *C22C 28/00* (2013.01); *H01M 10/345* (2013.01); *C22C 2202/04* (2013.01); *H01M 2004/027* (2013.01)

(56) References Cited

FOREIGN PATENT DOCUMENTS

| CN | 102828069 A | 12/2012 |
|---|---|---|
| CN | 103700895 A | 4/2014 |
| CN | 104152749 A | 11/2014 |
| CN | 104513915 A | 4/2015 |
| CN | 104513916 A | 4/2015 |
| CN | 104513925 A | 4/2015 |
| CN | 104518204 A | 4/2015 |
| CN | 104532062 A | 4/2015 |
| CN | 104532095 A | 4/2015 |
| WO | WO 02/101855 A1 | 12/2002 |

OTHER PUBLICATIONS

State Intellectual Property Office of the People's Republic of China, First Office Action issued in Chinese Patent Application No. 201410427179.9, (dated Feb. 3, 2016) 11 pp.
State Intellectual Property Office of the People's Republic of China, Second Office Action issued in Chinese Patent Application No. 201410427179.9, (dated Sep. 19, 2016) 13 pp.
State Intellectual Property Office of the People's Republic of China, First Office Action issued in Chinese Patent Application No. 201410427199.6, (dated Dec. 17, 2015) 11 pp.
State Intellectual Property Office of the People's Republic of China, Second Office Action issued in Chinese Patent Application No. 201410427199.6, (dated Jun. 27, 2016) 13 pp.
State Intellectual Property Office of the People's Republic of China, First Office Action issued in Chinese Patent Application No. 201410427220.2, (dated Feb. 3, 2016) 10 pp.
State Intellectual Property Office of the People's Republic of China, Second Office Action issued in Chinese Patent Application No. 201410427220.2, dated Sep. 19, 2016) 13 pp.
State Intellectual Property Office of the People's Republic of China, First Office Action issued in Chinese Patent Application No. 201410427259.4, (dated Jun. 2, 2016) 12 pp.
State Intellectual Property Office of the People's Republic of China, Second Office Action issued in Chinese Patent Application No. 201410427259.4, (dated Jan. 23, 2017) 13 pp.
State Intellectual Property Office of the People's Republic of China, Third Office Action issued in Chinese Patent Application No. 201410427259.4, (dated Jul. 3, 2017) 17 pp.
State Intellectual Property Office of the People's Republic of China, First Office Action issued in Chinese Patent Application No. 201410427281.9, (dated Feb. 3, 2016) 15 pp.
State Intellectual Property Office of the People's Republic of China, Second Office Action issued in Chinese Patent Application No. 201410427281.9, (dated Jul. 13, 2016) 17 pp.
State Intellectual Property Office of the People's Republic of China, First Office Action issued in Chinese Patent Application No. 201410429187.7, (dated Mar. 24, 2016) 14 pp.
State Intellectual Property Office of the People's Republic of China, Second Office Action issued in Chinese Patent Application No. 201410429187.7, (dated Nov. 28, 2016) 14 pp.
State Intellectual Property Office of the People's Republic of China, Third Office Action issued in Chinese Patent Application No. 201410429187.7, (dated Jun. 5, 2017) 11 pp.
State Intellectual Property Office of the People's Republic of China, First Office Action issued in Chinese Patent Application No. 201410429202.8, (dated Feb. 3, 2016) 14 pp.
State Intellectual Property Office of the People's Republic of China, Notification of Grant issued in Chinese Patent Application No. 201410429202.8, (dated Oct. 9, 2016) 3 pp.
Latroche et al., "Crystallographic and hydriding properties of the system $La_{1-x}Ce_xY_2Ni_9$ ($Xc_e$ = 0, 0.5 and 1)," *Journal of Solid State Chemistry*, 173: 236-243 (2003).
State Intellectual Property Office of the People's Republic of China, Office Action issued in Chinese Patent Application No. 201580046681.8 (dated May 11, 2018) 11 pp.

RARE EARTH BASED HYDROGEN STORAGE ALLOY AND APPLICATION THEREOF

CROSS-REFERENCE TO RELATED APPLICATIONS

This patent application is the U.S. national phase of International Application No. PCT/CN2015/088274, filed on Aug. 27, 2015, which claims priority from Chinese Application Nos. 201410427179.9, 201410427199.6, 201410427220.2, 201410427259.4, 201410427281.9, 201410429187.7, and 201410429202.8, all filed on Aug. 28, 2014, the disclosures of which are incorporated herein by reference in their entireties for all purposes.

TECHNICAL FIELD

The invention belongs to the field of hydrogen storage alloy, and relates to a rare earth based hydrogen storage alloy and the application thereof.

BACKGROUND

Hydrogen storage alloy is a functional material with high hydrogen-storage density. At present, hydrogen storage alloy could be roughly divided into six categories: rare earth based $AB_5$ type, such as $LaNi_5$; magnesium based, such as $Mg_2Ni$, $MgNi$, $La_2Mg_{17}$; rare earth-magnesium-nickel based $AB_{3-4}$ type, such as $La_2MgNi_9$, $La_5Mg_2Ni_{23}$, $La_3MgNi_{14}$; titanium based AB type, such as TiNi, TiFe; zirconium or titanium based $AB_2$ type with Laves phase, such as $ZrNi_2$; vanadium based solid solution type as $(V_{0.9}Ti_{0.1})_{1-x}Fe_x$.

The hydrogen-storage material widely used nowadays is $LaNi_5$ type hydrogen-storage alloy. The alloy is mainly used as a negative material of a metal hydride-nickel(MH-Ni) secondary battery, with a theoretical electrochemical capacity of about 373 mAh·g$^{-1}$. The commercial negative material electrode materials in actual application is $Mm(NiCoMnAl)_5$ (wherein Mm denotes mixed rare earths), which has a maximum capacity of 350 mAh·g$^{-1}$. In order to develop hydrogen-storage alloys with better electrochemical properties or higher hydrogen storage capacity, the research of magnesium based alloy has become a hotspot. Magnesium based alloys have high theoretical capacity. Especially, great progresses have been made in the study of rare earth-magnesium-nickel based $AB_3$ type, $A_2B_7$ type and $A_5B_{19}$ type alloys and these alloys has been put into industrial application. Titanium, zirconium and vanadium based hydrogen storage materials were not widely used due to their disadvantages such as poor activation characteristic, high cost, etc.

CN201310228766.0 discloses an $A_2B_7$ type hydrogen storage alloy for nickel-hydride battery and preparation method thereof. The composition of the alloy conforms to the general formula $Ln_aMg_bNi_xY_yZ_z$, wherein Ln denotes one or more rare earth element(s), Y denotes one or more element(s) selected from Al, Co, Nb, V, Fe, Cu, Zn, As, Ga, Mo, Sn, In, W, Si and P, and Z denotes one or more element(s) selected from Ag, Sr, Ge, $0.5 \leq a < 2$, $0 < b < 1$, $5 < X+Y+Z < 9$, $0 < Y < 3$, $0 < Z < 1$.

CN101210294A discloses a $A_5B_{19}$ type alloy. The alloy has a formula of $X_{5-a}Y_aZ_b$, wherein X denotes one or more of rear earth metals, Y denotes one or more of alkaline earth metal(s), Z denotes one or more element(s) selected from Mn, Al, V, Fe, Si, Sn, Ni, Co, Cr, Cu, Mo, Zn and B, $0 < a \leq 2$, $17.5 \leq b \leq 22.5$.

CN102195041A discloses a hydrogen storage alloy for an alkaline storage battery. The alloy has a formula of $La_xRe_yMg_{1-x-y}Ni_{n-m-v}Al_mT_v$, wherein Re denotes at least one rare earth element(s) including Y(ytterbium)(except La), T denotes at least one element(s) selected from Co, Mn and Zn; $0.17 \leq x \leq 0.64$, $3.5 \leq n \leq 3.8$, $0.06 \leq m \leq 0.22$, $v \geq 0$. The main phase of the alloy is $A_5B_{19}$ type crystal structure.

CN101238231A discloses a hydrogen storage alloy. The alloy contains a phase of $Pr_5Co_{19}$ type crystal structure, which conforms to the general formula $A_{(4-w)}B_{(1+w)}C_{19}$, wherein A denotes one or more element(s) selected from rare earth elements including Y (yttrium); B denotes Mg element; C denotes one or more element(s) selected from Ni, Co, Mn, and Al; and w denotes a numeral in a range from −0.1 to 0.8; and the alloy have a composition as a whole defined by the general formula $R1_xR2_yR3_z$, wherein $15.8 \leq x \leq 17.8$, $3.4 \leq y \leq 5.0$, $78.8 \leq z \leq 79.6$, and $x+y+z=100$; R1 denotes one or more element(s) selected from rare earth elements including Y (yttrium); R2 denotes an Mg element, R3 denotes one or more element(s) selected from Ni, Co, Mn, and Al; z is 0.5 or higher when it denotes the stoichiometric number of Mn+Al; z is 4.1 or lower when it denotes the stoichiometric number of Al.

CN102660700A discloses an $AB_3$ type hydrogen storage alloy and preparation method thereof. The chemical formula of the $AB_3$ type hydrogen storage alloy is $La_{0.35}Pr_{0.30}Mg_xNi_{2.90}Al_{0.30}$, wherein x=0.30~0.35.

CN102195041A discloses a hydrogen storage alloy for an alkaline storage battery, the composition of which conforms to the general formula $La_xRe_yMg_{1-x-y}Ni_{n-m-v}Al_mT_v$ (Re: rare earth elements including Y; T: Co, Mn, Zn; $0.17 \leq x \leq 0.64$, $3.5 \leq n \leq 3.8$, $0.06 \leq m \leq 0.22$, $v \geq 0$), and the alloy's main phase has a $A_5B_{19}$-type crystal structure.

CN103326004A discloses an $A_2B_7$ hydrogen storage alloy for a nickel metal hydride battery and preparation method thereof. The alloy conforms to the structural general formula: $Ln_aMg_bNi_xY_yZ_z$, wherein Ln denotes at least one element selected from rare earth elements; Y denotes least one element selected from Al, Co, Nb, V, Fe, Cu, Zn, As, Ga, Mo, Sn, In, W, Si and P; Z denotes at least one element selected from Ag, Sr and Ge; $0.5 \leq a < 2$, $0 < b < 1$, $5 < X+Y+Z < 9$, $0 < Y < 3$, $0 < Z < 1$.

The above alloys do not contain Y element, or do not contain Zr element, or do not contain Ti element. However, they all contain alkaline earth metals or magnesium element. Because the vapor pressure of active metal element magnesium is high, the difficulty of manufacturing the alloy is increased, and the composition of the alloy is difficult to control. The escaped micro-fine magnesium powder is flammable and combustible, which is a potential safety hazards.

Researches of "An electrochemical study of new $La_{1-x}Ce_xY_2Ni_9$ ($0 \leq x \leq 1$) hydrogen storage alloys" (Electrochimica Acta, 46 (2001): 2385-2393) and "New ternary intermetallic compounds belonging to the R—Y—Ni (R=La, Ce) system as negative material electrodes for Ni-MH batteries" (Journal of Alloys and Compounds, 330-332 (2002): 782-786) report an $AB_3$ type La—Y—Ni hydrogen storage alloy. Nevertheless, the alloy doesn't contain Mn and Al, and its maximum hydrogen storage capacity is only 260 mAh·g$^{-1}$.

SUMMARY

An object of the invention is to provide a rare earth based hydrogen storage alloy with high hydrogen storage capacity.

Another object of the invention is to provide a rare earth based hydrogen storage alloy with high electrochemical capacity. Another object of the invention is to provide a rare earth based hydrogen storage alloy which is easy to prepare, or the composition of which is easy to control, or the preparation process of which is safe.

In order to achieve one or more of the above objects, according to the first aspect of the present application, provided is a rare earth based hydrogen storage alloy represented by the general formula (I):

$$RE_xY_yNi_{z-a-b-c}Mn_aAl_bM_cZr_ATi_B \quad (I)$$

wherein RE denotes one or more element(s) selected from La, Ce, Pr, Nd, Sm, Gd; M denotes one or more element(s) selected from Cu, Fe, Co, Sn, V, W; $x>0$, $y \geq 0.5$, $x+y=3$; $13 \geq z \geq 7$; $6 \geq a+b>0$, $5 \geq c \geq 0$, $4 \geq A+B \geq 0$.

In a preferred embodiment for the rare earth based hydrogen storage alloy of the invention represented by the general formula (I), $x>0$, $y \geq 0.5$, $x+y=3$; $12.5 \geq z \geq 8.5$; $5.5 \geq a+b>0$, $3.5 \geq c \geq 0$, $2.5 \geq A+B \geq 0$.

In a preferred embodiment for the rare earth based hydrogen storage alloy of the invention represented by the general formula (I), RE denotes La and/or Ce.

In another preferred embodiment for the rare earth based hydrogen storage alloy of the invention represented by the general formula (I), RE denotes La.

In another preferred embodiment for the rare earth based hydrogen storage alloy of the invention represented by the general formula (I), RE denotes Ce.

In another preferred embodiment for the rare earth based hydrogen storage alloy of the invention represented by the general formula (I), RE denotes mischmetal consisting of La and Ce, preferably the atomic ratio of La and Ce is 0.8:0.2.

In another preferred embodiment for the rare earth based hydrogen storage alloy of the invention represented by the general formula (I), RE denotes Lanthanum-rich mischmetal wherein La accounts for about 64 wt %, Ce accounts for about 25 wt %, Pr accounts for about 3 wt % and Nd accounts for about 8 wt %.

In a preferred embodiment for the rare earth based hydrogen storage alloy of the invention represented by the general formula (I), $2.5 \geq A+B>0$.

In a preferred embodiment for the rare earth based hydrogen storage alloy of the invention represented by the general formula (I), $c=0$, $A=B=0$.

In a preferred embodiment for the rare earth based hydrogen storage alloy of the invention represented by the general formula (I), $11>z \geq 9.5$, $4.5 \geq a+b>0$.

In a preferred embodiment for the rare earth based hydrogen storage alloy of the invention represented by the general formula (I), $12.5 \geq z \geq 11$, $5.5 \geq a+b>0$.

In a preferred embodiment for the rare earth based hydrogen storage alloy of the invention represented by the general formula (I), $9.5>z \geq 8.5$; $3.5 \geq a+b>0$.

In a preferred embodiment for the rare earth based hydrogen storage alloy of the invention represented by the general formula (I), $A=B=0$, $c>0$.

In another preferred embodiment for the rare earth based hydrogen storage alloy of the invention represented by the general formula (I), $3.5 \geq a+b \geq 0$; $3.0 \geq c>0$.

In a preferred embodiment for the rare earth based hydrogen storage alloy of the invention represented by the general formula (I), $c=0$, $A=B=0$, $11>z \geq 9.5$, $4.5 \geq a+b>0$. In such embodiment, the rare earth based hydrogen storage alloy of the invention represented by the general formula (I) may be represented by the general formula (I-1):

$$RE_xY_yNi_{z-a-b}Mn_aAl_b \quad (I-1)$$

wherein: RE denotes one or more element(s) selected from La, Ce, Pr, Nd, Sm, Gd; $x>0$, $y \geq 0.5$, $x+y=3$; $11>z \geq 9.5$; $4.5 \geq a+b>0$. When $z=10.5$, the hydrogen storage alloy is stoichiometric $A_2B_7$ type; when $z \neq 10.5$, the hydrogen storage alloy is non-stoichiometric $A_2B_7$ type.

In a preferred embodiment for the rare earth based hydrogen storage alloy represented by the general formula (I-1), $2.5 \geq x \geq 0.5$, preferably $2.0 \geq x \geq 0.5$, further preferably $1.2 \geq x \geq 0.8$.

In another preferred embodiment for the rare earth based hydrogen storage alloy represented by the general formula (I-1), $2.5 \geq a \geq 0$, preferably $2.5 \geq a \geq 0.5$, further preferably $0.6 \geq a \geq 0.4$.

In another preferred embodiment for the rare earth based hydrogen storage alloy represented by the general formula (I-1), $1.0 \geq b \geq 0$, preferably $1.0 \geq b \geq 0.2$, or preferably $0.3 \geq b \geq 0$.

In another preferred embodiment for the rare earth based hydrogen storage alloy represented by the general formula (I-1), $10.8 \geq z \geq 9.5$, preferably $z=10.5$.

In another preferred embodiment for the rare earth based hydrogen storage alloy represented by the general formula (I-1), $2.0 \geq x \geq 0.5$, $2.5 \geq a \geq 0.5$, $1.0 \geq b \geq 0.2$, $z=10.5$.

In a preferred embodiment for the rare earth based hydrogen storage alloy of the invention represented by the general formula (I), $c=0$, $A=B=0$, $12.5 \geq z \geq 11$. In such embodiment, the rare earth based hydrogen storage alloy of the invention represented by the general formula (I) may be represented by the general formula (I-1):

$$RE_xY_yNi_{z-a-b}Mn_aAl_b \quad (I-1)$$

wherein RE denotes one or more element(s) selected from La, Ce, Pr, Nd, Sm, Gd; $x>0$, $y \geq 0.5$, $x+y=3$; $12.5 \geq z \geq 11$; $5.5 \geq a+b>0$. When $z=11.4$, the hydrogen storage alloy is stoichiometric $A_5B_{19}$ type; when $z \neq 11.4$, the hydrogen storage alloy is non-stoichiometric $A_5B_{19}$ type.

In a preferred embodiment for the rare earth based hydrogen storage alloy represented by the general formula (I-1), $2.5 \geq x \geq 0.5$, preferably $2.0 \geq x \geq 0.5$, further preferably $1.5 \geq x \geq 1$.

In another preferred embodiment for the rare earth based hydrogen storage alloy represented by the general formula (I-1), $3.0 \geq a \geq 0$, preferably $3.0 \geq a \geq 0.5$, further preferably $1.0 \geq a \geq 0.5$.

In another preferred embodiment for the rare earth based hydrogen storage alloy represented by the general formula (I-1), $1.5 \geq b \geq 0$, preferably $1.5 \geq b \geq 0.3$, further preferably $0.5 \geq b \geq 0$;

In another preferred embodiment for the rare earth based hydrogen storage alloy represented by the general formula (I-1), $12.5 \geq z \geq 11$, preferably $11.4 \geq z \geq 11.0$ further preferably $z=11.4$.

In another preferred embodiment for the rare earth based hydrogen storage alloy represented by the general formula (I-1), $2.0 \geq x \geq 0.5$, $3.0 \geq a \geq 0.5$, $1.5 \geq b \geq 0.3$, $z=11.4$.

In another preferred embodiment for the rare earth based hydrogen storage alloy of the invention represented by the general formula (I), $c=0$, $A=B=0$, $9.5>z \geq 8.5$; $3.5 \geq a+b>0$. In such embodiment, the rare earth based hydrogen storage alloy of the invention represented by the general formula (I) may be represented by the general formula (I-1):

$$RE_xY_yNi_{z-a-b}Mn_aAl_b \quad (I-1)$$

wherein RE denotes one or more element(s) selected from La, Ce, Pr, Nd, Sm, Gd, $x>0$, $y \geq 0.5$, $x+y=3$; $9.5>z \geq 8.5$, $3.5 \geq a+b>0$. When $z=9$, the hydrogen storage alloy is stoichiometric $AB_3$ type; when $z \neq 9$, the hydrogen storage alloy is non-stoichiometric $AB_3$ type.

In a preferred embodiment for the rare earth based hydrogen storage alloy represented by the general formula (I-1), $2.5 \geq x \geq 0.5$, preferably $2.0 \geq x \geq 0.5$.

In another preferred embodiment for the rare earth based hydrogen storage alloy represented by the general formula (I-1), $2 \geq a \geq 0$; preferably $2 \geq a \geq 0.5$.

In another preferred embodiment for the rare earth based hydrogen storage alloy represented by the general formula (I-1), $1.0 \geq b \geq 0$, preferably $1.0 \geq b \geq 0.2$.

In another preferred embodiment for the rare earth based hydrogen storage alloy represented by the general formula (I-1), $9.5 \geq z \geq 8.5$, preferably $z=9$.

In another further preferably embodiment for the rare earth based hydrogen storage alloy represented by the general formula (I-1), $2.0 \geq x \geq 0.5$, $2.0 \geq a \geq 0.5$, $1.0 \geq b \geq 0.2$, $z=9$.

In another preferred embodiment for the rare earth based hydrogen storage alloy represented by the general formula (I-1), RE denotes La and/or Ce.

In another preferred embodiment for the rare earth based hydrogen storage alloy represented by the general formula (I-1), RE denotes La.

In another preferred embodiment for the rare earth based hydrogen storage alloy represented by the general formula (I-1), RE denotes Ce.

In another preferred embodiment for the rare earth based hydrogen storage alloy represented by the general formula (I-1), RE denotes mischmetal consisting of La and Ce, preferably wherein the atomic ratio of La and Ce is 0.8:0.2.

In another preferred embodiment for the rare earth based hydrogen storage alloy represented by the general formula (I-1), RE denotes Lanthanum-rich mischmetal, La accounts for about 64 wt %, Ce accounts for about 25 wt %, Pr accounts for about 3 wt % and Nd accounts for about 8 wt %.

In another preferred embodiment for the rare earth based hydrogen storage alloy of the invention represented by the general formula (I), $A=B=0$, $3.5 \geq a+b \geq 0$; $3.0 \geq c > 0$. In such embodiment, the rare earth based hydrogen storage alloy of the invention represented by the general formula (I) may be represented by the general formula (I-2):

$$RE_xY_yNi_{z-a-b-c}Mn_aAl_bM_c \quad (I-2)$$

wherein RE denotes one or more element(s) selected from La, Ce, Pr, Nd, Sm, Gd, M denotes one or more element(s) selected from Cu, Fe, Co, Sn, V, W; $x>0$, $y \geq 0.5$, $x+y=3$; $12.5 \geq z \geq 8.5$, $3.5 \geq a+b > 0$, $3.0 \geq c > 0$.

In a preferred embodiment for the rare earth based hydrogen storage alloy represented by the general formula (I-2), $2.5 \geq x \geq 0.5$, preferably $2.0 \geq x \geq 0.5$, further preferably $1.2 \geq x \geq 1$.

In another preferred embodiment for the rare earth based hydrogen storage alloy represented by the general formula (I-2), $2.0 \geq a \geq 0.5$, preferably $1 \geq a \geq 0.5$.

In another preferred embodiment for the rare earth based hydrogen storage alloy represented by the general formula (I-2), $1.0 \geq b \geq 0.3$; preferably $0.5 \geq b \geq 0.3$.

In another preferred embodiment for the rare earth based hydrogen storage alloy represented by the general formula (I-2), $12.5 \geq z \geq 8.5$, preferably $11.4 \geq z \geq 9$, further preferably $11 \geq z \geq 10$.

In another preferred embodiment for the rare earth based hydrogen storage alloy represented by the general formula (I-2), $2.5 \geq c \geq 0.1$, preferably $1 \geq c \geq 0.5$.

In another preferred embodiment for the rare earth based hydrogen storage alloy represented by the general formula (I-2), $2.0 \geq x \geq 0.5$, $2.0 \geq a \geq 0.5$, $1.0 \geq b \geq 0.3$, $2.5 \geq c \geq 0.1$, $11.4 \geq z \geq 9$.

In another preferred embodiment for the rare earth based hydrogen storage alloy represented by the general formula (I-2), RE denotes La and/or Ce.

In another preferred embodiment for the rare earth based hydrogen storage alloy represented by the general formula (I-2), RE denotes La.

In another preferred embodiment for the rare earth based hydrogen storage alloy represented by the general formula (I-2), RE denotes Ce.

In another preferred embodiment for the rare earth based hydrogen storage alloy represented by the general formula (I-2), RE denotes mischmetal consisting of La and Ce, preferably the atomic ratio of La and Ce is 0.8:0.2.

In another preferred embodiment for the rare earth based hydrogen storage alloy represented by the general formula (I-2), RE denotes Lanthanum-rich mischmetal, La accounts for about 64 wt %, Ce accounts for about 25 wt %, Pr accounts for about 3 wt % and Nd accounts for about 8 wt %.

In a preferred embodiment for the rare earth based hydrogen storage alloy of the invention represented by the general formula (I), $12.5 \geq z \geq 11$, $4 \geq a+b > 0$.

In another preferred embodiment for the rare earth based hydrogen storage alloy of the invention represented by the general formula (I), RE denotes one or more element(s) selected from La, Ce, Pr, Nd, Sm, Gd, $x>0$, $y \geq 0.5$, $x+y=3$; M denotes one or more element(s) selected from Cu, Fe, Co, Sn, V, W, $12.5 \geq z \geq 11$ (when $z=11.4$, the alloy is stoichiometric $A_5B_{19}$ type; when $z \neq 11.4$, the alloy is non-stoichiometric $A_5B_{19}$ type), $4 \geq a+b > 0$, $3.5 \geq c \geq 0$, $2.5 \geq A+B > 0$;

preferably, $2.5 \geq x \geq 0.5$, further preferably, $2.0 \geq x \geq 0.5$;

preferably, $2.5 \geq a \geq 0$, further preferably, $2.5 \geq a \geq 0.5$;

preferably, $1.0 \geq b \geq 0$, further preferably, $1.0 \geq b \geq 0.2$, still further preferably, $0.5 \geq b \geq 0$;

preferably, $2.5 \geq a \geq 0.5$, $1.0 \geq b \geq 0.2$;

preferably, $2.5 \geq c \geq 0$, further preferably, $2.5 \geq c \geq 0.1$, still further preferably, $0.5 \geq c \geq 0$;

preferably, $1.0 \geq A \geq 0$, further preferably, $1.0 \geq A \geq 0.1$, still further preferably, $0.5 \geq A \geq 0.1$;

preferably, $1.0 \geq B \geq 0$, further preferably, $1.0 \geq B \geq 0.1$, still further preferably, $0.3 \geq B \geq 0$;

preferably, $z=11.4$.

In a preferably embodiment for the rare earth based hydrogen storage alloy of the invention represented by the general formula (I), RE denotes one or more element(s) selected from La, Ce, Pr, Nd, Sm, Gd; M denotes one or more element(s) selected from Cu, Fe, Co, Sn, V, W, $2.0 \geq x \geq 0.5$, $2.5 \geq a \geq 0.5$, $1.0 \geq b \geq 0.2$, $2.5 \geq c \geq 0.1$, $1.0 \geq A \geq 0.1$, $1.0 \geq B \geq 0.1$, $z=11.4$.

In a preferred embodiment for the rare earth based hydrogen storage alloy of the invention represented by the general formula (I), $11 > z \geq 9.5$; $3.5 \geq a+b > 0$; $3 \geq c \geq 0$.

In another preferred embodiment for the rare earth based hydrogen storage alloy of the invention represented by the general formula (I), RE denotes one or more element(s) selected from La, Ce, Pr, Nd, Sm, Gd, $x>0$, $y \geq 0.5$, $x+y=3$; M denotes one or more element(s) selected from Cu, Fe, Co, Sn, V, W, $11 > z \geq 9.5$ (when $z=10.5$, the alloy is stoichiometric $A_2B_7$ type; when $z \neq 10.5$, the alloy is non-stoichiometric $A_2B_7$ type), $3.5 \geq a+b > 0$, $3 \geq c \geq 0$, $2 \geq A+B > 0$;

preferably $2.5 \geq x \geq 0.5$, further preferably $2.0 \geq x \geq 0.5$;

preferably $2.0 \geq a \geq 0$, further preferably $2.0 \geq a \geq 0.5$, further preferably $1.0 \geq a \geq 0.5$;

preferably $1.0 \geq b \geq 0$, further preferably $1.0 \geq b \geq 0.2$, further preferably $0.5 \geq b \geq 0$;

preferably $2.0 \geq c \geq 0$, further preferably $2.0 \geq c \geq 0.1$, further preferably $0.5 \geq c \geq 0$;

preferably $1.0 \geq A \geq 0.1$, further preferably $0.5 \geq A \geq 0.1$;
preferably $1.0 \geq B \geq 0.1$, further preferably $0.3 \geq B \geq 0.1$;
preferably $10.8 \geq z \geq 9.5$, further preferably $z=10.5$.

In another preferred embodiment for the rare earth based hydrogen storage alloy of the invention represented by the general formula (I), RE denotes one or more element(s) selected from La, Ce, Pr, Nd, Sm, Gd, M denotes one or more element(s) selected from Cu, Fe, Co, Sn, V, W, $2.0 \geq x \geq 0.5$, $2.0 \geq a \geq 0.5$, $1.0 \geq b \geq 0.2$, $2.0 \geq c \geq 0.1$, $1.0 \geq A \geq 0.1$, $1.0 \geq B \geq 0.1$, $z=10.5$.

In a preferred embodiment for the rare earth based hydrogen storage alloy of the invention represented by the general formula (I), $9.5 > z \geq 8.5$; $3 \geq a+b > 0$; $2.5 \geq c \geq 0$.

In another preferred embodiment for the rare earth based hydrogen storage alloy of the invention represented by the general formula (I), RE denotes one or more element(s) selected from La, Ce, Pr, Nd, Sm, Gd, $x > 0$, $y \geq 0.5$, $x+y=3$; M denotes one or more element(s) selected from Cu, Fe, Co, Sn, V, W, $9.5 > z \geq 8.5$ (when $z=9$, the alloy is stoichiometric $AB_3$ type; when $z \neq 9$, the alloy is non-stoichiometric $AB_3$ type), $3 \geq a+b > 0$, $2.5 \geq c \geq 0$, $2 \geq A+B > 0$;

preferably $2.5 \geq x \geq 0.5$, further preferably $2.0 \geq x \geq 0.5$, further preferably $1.2 \geq x \geq 0.8$, for example, $x=1$;

preferably $2.0 \geq a \geq 0$, further preferably $2.0 \geq a \geq 0.5$, further preferably $0.6 \geq a \geq 0.4$, for example, $a=0.5$;

preferably $1.0 \geq b \geq 0$, further preferably $1.0 \geq b \geq 0.2$, further preferably $0.5 \geq b \geq 0$;

preferably $2.0 \geq c \geq 0$, further preferably $2.0 \geq c \geq 0.1$, further preferably $0.5 \geq c \geq 0$;

preferably $1.0 \geq A \geq 0$, further preferably $1.0 \geq A \geq 0.1$, further preferably $0.5 \geq A \geq 0.1$;

preferably $1.0 \geq B \geq 0$, further preferably $1.0 \geq B \geq 0.1$, further preferably $0.3 \geq B \geq 0.2$;

preferably $9.4 \geq z \geq 8.5$, further preferably $9.4 \geq z \geq 9$, further preferably $z=9$.

In another preferred embodiment for the rare earth based hydrogen storage alloy of the invention represented by the general formula (I), RE denotes one or more element(s) selected from La, Ce, Pr, Nd, Sm and Gd; M denotes one or more element(s) selected from Cu, Fe, Co, Sn, V and W, $2.0 \geq x \geq 0.5$, $2.0 \geq a \geq 0.5$, $1.0 \geq b \geq 0.2$, $2.0 \geq c \geq 0.1$, $1.0 \geq A \geq 0.1$, $1.0 \geq B \geq 0.1$, $z=9$.

In an embodiment for the rare earth based hydrogen storage alloy of the invention represented by the general formula (I), x may be 0.1, 0.2, 0.3 or 0.4, x may also be 0.5, 0.6 or 0.7, x may also be 0.8, 0.9 or 1, x may also be 1.1, 1.2 or 1.3, x may also be 1.4, 1.5 or 1.6, x may also be 1.7, 1.8 or 1.9, x may also be 2, 2.1 or 2.2, x may also be 2.3, 2.4 or 2.5.

In an embodiment for the rare earth based hydrogen storage alloy of the invention represented by the general formula (I), y may be 0.5, 0.6 or 0.7, y may also be 0.8, 0.9 or 1, y may also be 1.1, 1.2 or 1.3, y may also be 1.4, 1.5 or 1.6, y may also be 1.7, 1.8 or 1.9, y may also be 2, 2.1 or 2.2, y may also be 2.3, 2.4 or 2.5, y may also be 2.6, 2.7, 2.8 or 2.9.

In an embodiment for the rare earth based hydrogen storage alloy of the invention represented by the general formula (I), a may be 0, a may also be 0.1, 0.2, 0.3, 0.4 or 0.5, a may also be 0.6, 0.7, 0.8, 0.9 or 1, a may also be 1.1, 1.2, 1.3, 1.4 or 1.5, a may also be 1.6, 1.7, 1.8, 1.9 or 2, a may also be 2.1, 2.2, 2.3, 2.4 or 2.5, a may also be 2.6, 2.7, 2.8, 2.9 or 3.

In an embodiment for the rare earth based hydrogen storage alloy of the invention represented by the general formula (I), b may be 0, b may also be 0.1, 0.2 or 0.3, b may also be 0.4, 0.5 or 0.6, b may also be 0.7, 0.8 or 0.9, b may also be 1.

In an embodiment for the rare earth based hydrogen storage alloy of the invention represented by the general formula (I), z may be 8.5, 8.6, 8.7, 8.8, 8.9 or 9, z may also be 9.1, 9.2, 9.3, 9.4 or 9.5, z may also be 9.6, 9.7, 9.8, 9.9 or 10, z may also be 10.1, 10.2, 10.3, 10.4 or 10.5, z may also be 10.6, 10.7, 10.8, 10.9 or 11, z may also be 11.1, 11.2, 11.3, 11.4 or 11.5, z may also be 11.6, 11.7, 11.8, 11.9 or 12, z may also be 12.1, 12.2, 12.3, 12.4 or 12.5.

In an embodiment for the rare earth based hydrogen storage alloy of the invention represented by the general formula (I), c may be 0, c may also be 0.1, 0.2, 0.3, 0.4 or 0.5, c may also be 0.6, 0.7, 0.8, 0.9 or 1, c may also be 1.1, 1.2, 1.3, 1.4 or 1.5, c may also be 1.6, 1.7, 1.8, 1.9 or 2, c may also be 2.1, 2.2, 2.3, 2.4 or 2.5, c may also be 2.6, 2.7, 2.8, 2.9 or 3, c may also be 3.1, 3.2, 3.3, 3.4 or 3.5.

In an embodiment for the rare earth based hydrogen storage alloy of the invention represented by the general formula (I), A may be 0, A may also be 0.1, 0.2 or 0.3, A may also be 0.4, 0.5 or 0.6, A may also be 0.7, 0.8 or 0.9, A may also be 1.

In an embodiment for the rare earth based hydrogen storage alloy of the invention represented by the general formula (I), B may be 0, B may also be 0.1, 0.2 or 0.3, B may also be 0.4, 0.5 or 0.6, B may also be 0.7, 0.8 or 0.9, B may also be 1.

In an embodiment for the rare earth based hydrogen storage alloy of the invention represented by the general formula (I), x may be 0.5, 1, 1.2, 1.5, 2 or 2.5, x may also be 1, 1.2 or 1.5.

In an embodiment for the rare earth based hydrogen storage alloy of the invention represented by the general formula (I), y may be 0.5, 1, 1.5, 1.8, 2 or 2.5, y may also be 1.5, 1.8 or 2.

In an embodiment for the rare earth based hydrogen storage alloy of the invention represented by the general formula (I), a may be 0, 0.5, 0.8, 1, 1.5, 2, 2.5 or 3, a may also be 0.5, 0.8, 1, 1.5, 2 or 2.5.

In an embodiment for the rare earth based hydrogen storage alloy of the invention represented by the general formula (I), b may be 0, 0.2, 0.3, 0.5, 0.8, 1 or 1.5, b may also be 0, 0.2, 0.3 or 0.5.

In an embodiment for the rare earth based hydrogen storage alloy of the invention represented by the general formula (I), c may be 0, 0.1, 0.2, 0.5, 1, 1.5, 2 or 2.5, c may also be 0, 0.1 or 0.5.

In an embodiment for the rare earth based hydrogen storage alloy of the invention represented by the general formula (I), A may be 0, 0.1, 0.2, 0.3, 0.5 or 1, A may also be 0.1, 0.3 or 0.5.

In an embodiment for the rare earth based hydrogen storage alloy of the invention represented by the general formula (I), B may be 0, 0.1, 0.2, 0.3, 0.5 or 1, B may also be 0, 0.1, 0.2 or 0.3.

In an embodiment for the rare earth based hydrogen storage alloy of the invention represented by the general formula (I), when $z=9$, the alloy is stoichiometric $AB_3$ type; when $z \neq 9$, the alloy is non-stoichiometric $AB_3$ type.

In an embodiment for the rare earth based hydrogen storage alloy of the invention represented by the general formula (I), when $z=10.5$, the alloy is stoichiometric $A_2B_7$ type; $z \neq 10.5$, the alloy is non-stoichiometric $A_2B_7$ type.

In an embodiment for the rare earth based hydrogen storage alloy of the invention represented by the general formula (I), when $z=11.4$, the alloy is stoichiometric $A_5B_{19}$ type; $z \neq 11.4$, the alloy is non-stoichiometric $A_5B_{19}$ type.

In an embodiment for the rare earth based hydrogen storage alloy of the invention represented by the general formula (I), comprises one or more phase(s) selected from $Y_2Ni_7$, $La_2Ni_7$, $LaNi_5$, $Ni_5Y$, $Ce_2Ni_7$, $Al_2Ni_6Y_3$ and $LaY_2Ni_9$.

In an embodiment for the rare earth based hydrogen storage alloy of the invention represented by the general formula (I), comprises one or more phase(s) selected from $Y_2Ni_7$, $La_2Ni_7$, $LaNi_5$ and $Ce_2Ni_7$.

In an embodiment for the rare earth based hydrogen storage alloy of the invention represented by the general formula (I), comprises one or more phase(s) selected from $Y_2Ni_7$, $La_2Ni_7$, $LaNi_5$ and $Al_2Ni_6Y_3$.

In an embodiment for the rare earth based hydrogen storage alloy of the invention represented by the general formula (I), comprises one or more phase(s) selected from $Y_2Ni_7$ and $LaY_2Ni_9$.

In an embodiment for the rare earth based hydrogen storage alloy of the invention represented by the general formula (I), comprises one or more phase(s) selected from $Y_2Ni_7$ and $La_2Ni_7$, $Ni_5Y$.

In an embodiment for the rare earth based hydrogen storage alloy of the invention represented by the general formula (I), comprises $LaY_2Ni_9$ phase.

In an embodiment for the rare earth based hydrogen storage alloy of the invention represented by the general formula (I), comprises one or more phase(s) selected from $Y_2Ni_7$ and $La_2Ni_7$.

In an embodiment for the rare earth based hydrogen storage alloy of the invention represented by the general formula (I) comprises $Y_2Ni_7$ phase.

In an embodiment for the rare earth based hydrogen storage alloy of the invention represented by the general formula (I) has a maximum hydrogen storage capacity of 1.2~1.5 wt %, preferably 1.3~1.5 wt %, optionally 1.2~1.4 wt % or 1.3~1.4 wt %, at a temperature of 313K, In an embodiment, when used as a negative material electrode for a Ni-MH battery, the rare earth based hydrogen storage alloy of the invention represented by the general formula (I) has a maximum discharge capacity of 300~400 mAh/g, preferably 350~400 mAh/g, further preferably 370~400 mAh/g, still further preferably 380~400 mAh/g, at a current density of 70 mA/g. The cut-off discharge voltage may be 1.0V.

In an embodiment, when used as a negative material electrode for a Ni-MH battery, the rare earth based hydrogen storage alloy of the invention represented by the general formula (I) has a capacity retention of more than 85%, preferably more than 90%, more preferably more than 95%, still further preferably more than 98% after 100 cycles of charge and discharge, at a current density of 70 mA/g. The cut-off discharge voltage may be 1.0V.

According to the second aspect of the present application, provided is use of the rare earth based hydrogen storage alloy of the invention represented by the general formula (I) of the invention as a hydrogen storage medium.

According to the third aspect of the present application, provided is use of the rare earth based hydrogen storage alloy of the invention represented by the general formula (I) of the invention in manufacturing an electrode of a secondary battery.

The rare earth based hydrogen storage alloy of the invention represented by the general formula (I) of the invention may be manufactured into electrode, and the electrode could be made into a secondary battery coupled with other suitable materials. The secondary battery made from the rare earth based hydrogen storage alloy of the invention represented by the general formula (I) of the invention can be discharged and recharged for multiple times.

The rare earth based hydrogen storage alloy of the invention represented by the general formula (I) of the invention could be produced by a method comprising the following steps:

(i) providing raw materials according to the composition of the alloy product;

(ii) smelting the raw materials;

(iii) rapidly solidifying the smelted raw materials on a copper roller;

preferably, the linear speed of the copper roller in step (iii) is 3-4 m/s, and the copper roller is supplied with cooling water.

In an embodiment, in the method of preparing the rare earth based hydrogen storage alloy of the invention, after the step of rapidly solidifying, the prepared alloy is annealed at 700~800° C. for 6~10 hours, e.g. at 750° C. for 8 hours, under vacuum or inert gas.

In an embodiment, the hydrogen storage alloy of the invention may be produced by high temperature smelting-rapidly quenching method comprising the following steps: providing components satisfying the stoichiometric ratio of the chemical formula by weighing each raw material accurately, wherein the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert gas Ar to a pressure of 0.055 MPa; smelting the raw materials, keeping the temperature of the smelted raw materials for about 6 minutes and then performing rapidly quenching. The linear speed of the copper roller used for rapidly quenching is 3.4 m/s. The copper roller is cooled with cooling water having a temperature of 25° C.

In an embodiment, in the method of preparing the rare earth based hydrogen storage alloy of the invention, the mass ratio of the raw materials which is prior to loss by burning are increased at an appropriate amount, the increase rate is shown in the following table:

| raw material | RE | Y | Mn | Al |
|---|---|---|---|---|
| increase rate | 2% | 1% | 5% | 3% |

Besides the abovementioned methods, the hydrogen storage alloy represented by the general formula (I) of the invention may be produced by other methods for producing hydrogen storage alloys, such as: high-temperature smelting and casting method, mechanical alloying (MA) method, powder sintering method, high-temperature smelting and gas atomization method, reduction diffusion method, replacement-diffusion method, combustion synthesis (CS) method or self-propagating high temperature synthesis (SHS) method.

According to the fourth aspect of the invention, provided is the rare earth based hydrogen storage alloy represented by the general formula (I) as a hydrogen storage medium.

According to the fifth aspect of the invention, provided is the rare earth based hydrogen storage alloy represented by the general formula (I) for manufacturing an electrode of a secondary battery.

The rare earth based hydrogen storage alloy represented by the general formula (I) could be composited with other hydrogen storage alloys in various proportions to fabricate new hydrogen storage materials.

Heat treatment may be performed to improve the microstructures and properties of the rare earth based hydrogen storage alloy of the invention represented by the general formula (I), for example, to relieve structural stresses and eliminate component segregation, or to improve hydrogen absorption/desorption plateau characteristics or discharge/charge plateau characteristics, or to increase hydrogen storage capacity and cycle life. Various surface treatments may be performed to improve the alloy's performance, such as to improve the kinetics performance of hydrogen absorption/desorption processes or charge/discharge processes of the alloy, or to enhance the antioxidant ability of the alloy, or to improve the electrical/thermal conductivity of the alloy.

In the invention, unless otherwise specified, symbols for elements are consistent with the Periodic Table of Elements. In the general formula (I) of the invention, Y denotes yttrium, Ni denotes nickel, Mn denotes manganese, Al denotes aluminum, Zr denotes zirconium and Ti denotes titanium.

The Beneficial Effects of the Invention

The rare earth based hydrogen storage alloy of the invention represented by the general formula (I) of the invention has one or more of the following advantage(s):

(1) It has a favorable pressure-composition-temperature (P-c-T) feature. Under normal conditions, the hydrogen storage capacity could reach 1.28 wt % or more, the maximum hydrogen storage capacity of the alloy could reach 1.36 wt % or more;

(2) The electrochemical performance and hydrogen gas absorption and desorption performance of the rare earth based hydrogen storage alloy of the invention as hydrogen storage electrode are better than the traditional $LaNi_5$ type hydrogen storage alloy;

(3) The rare earth based hydrogen storage alloy of the invention doesn't contain magnesium, and therefore the preparation methods of the rare earth based hydrogen storage alloy of the invention is easier and safer compared to that of the traditional rare earth-magnesium-nickel hydrogen storage alloy (4) The rare earth based hydrogen storage alloy of the invention has favorable activation performance, rate discharge ability, charging/discharging or hydrogen absorbing/desorbing cycling stability. It can work at a wide range of temperature and has a low self-discharge rate.

(5) One of the main components of the rare earth based hydrogen storage alloy of the invention is yttrium (Y). As Yttrium is abundant in rare earth minerals, the application of yttrium is beneficial for comprehensive utilization of rare earth resources of China.

BRIEF DESCRIPTION OF THE DRAWINGS

The drawings described herein are used to provide a further understanding of the invention and constitute a part of this application, in which:

FIG. 1-2 is a redrawn XRD pattern of hydrogen storage alloy, $LaCe_{0.5}Y_{1.5}Ni_{9.7}Mn_{0.5}Al_{0.3}$ according to the original XRD data of FIG. 1-1 (Example A23);

FIG. 1-3 is a P-c-T curve of the hydrogen storage alloy $LaY_2Ni_{9.5}Mn_{0.5}Al_{0.5}$ (Example A13);

FIG. 2-1 is a XRD pattern of the hydrogen storage alloy $LaY_2Ni_{10.6}Mn_{0.5}Al_{0.3}$ (Example B2);

FIG. 2-2 is a redrawn XRD pattern of the hydrogen storage alloy $LaY_2Ni_{10.6}Mn_{0.5}Al_{0.3}$ according to the original XRD data of FIG. 2-1 (Example B2);

FIG. 2-3 is a P-c-T curve of the hydrogen storage alloy $LaY_2Ni_{10.6}Mn_{0.5}Al_{0.3}$ (Example B2);

FIG. 3-1 is a XRD pattern of the hydrogen storage alloy $LaY_2Ni_8Mn_{0.5}Al_{0.5}$ (Example C13);

FIG. 3-2 a redrawn XRD pattern of the hydrogen storage alloy $LaY_2Ni_8Mn_{0.5}Al_{0.5}$ according to the original XRD data of FIG. 3-1 (Example C13);

FIG. 4-1 is a XRD pattern of the hydrogen storage alloy $La_{1.2}Y_{1.8}Ni_{9.2}Mn_{0.5}Al_{0.3}Co_{0.5}$ (Example D28);

FIG. 4-2 a redrawn XRD pattern of the hydrogen storage alloy $La_{1.2}Y_{1.8}Ni_{9.2}Mn_{0.5}Al_{0.3}Co_{0.5}$, according to the original XRD data of FIG. 4-1 (Example D28);

FIG. 4-3 is a pressure-composition-temperature (P-c-T) curve of the alloy $LaY_2Ni_{9.5}Mn_{0.5}Al_{0.3}Cu_{0.2}$ (Example D38);

FIG. 5-1 is an XRD pattern of the hydrogen storage alloy $La_{1.2}Y_{1.8}Ni_{9.2}Mn_{0.5}Al_{0.3}Co_{0.5}Zr_{0.1}Ti_{0.1}$ (Example E18);

FIG. 5-2 an redrawn XRD pattern of the hydrogen storage alloy, $La_{1.2}Y_{1.8}Ni_{9.2}Mn_{0.5}Al_{0.3}Co_{0.5}Zr_{0.1}Ti_{0.1}$, according to the original XRD data of FIG. 5-1 (Example E18);

FIG. 6-1 is an X ray diffraction pattern of the alloy $LaY_2Ni_{10.6}Mn_{0.5}Al_{0.3}Zr_{0.1}$ (Example F35);

FIG. 7-1 is an XRD pattern of the hydrogen storage alloy, $LaY_2Ni_{8.3}Mn_{0.5}Al_{0.2}Zr_{0.1}$ (Example G18);

FIG. 7-2 a redrawn XRD pattern of the hydrogen storage alloy, $LaY_2Ni_{8.3}Mn_{0.5}Al_{0.2}Zr_{0.1}$, according to the original XRD data of FIG. 7-1 (Example G18).

DETAILED DESCRIPTION OF THE EMBODIMENT

Figure 1:
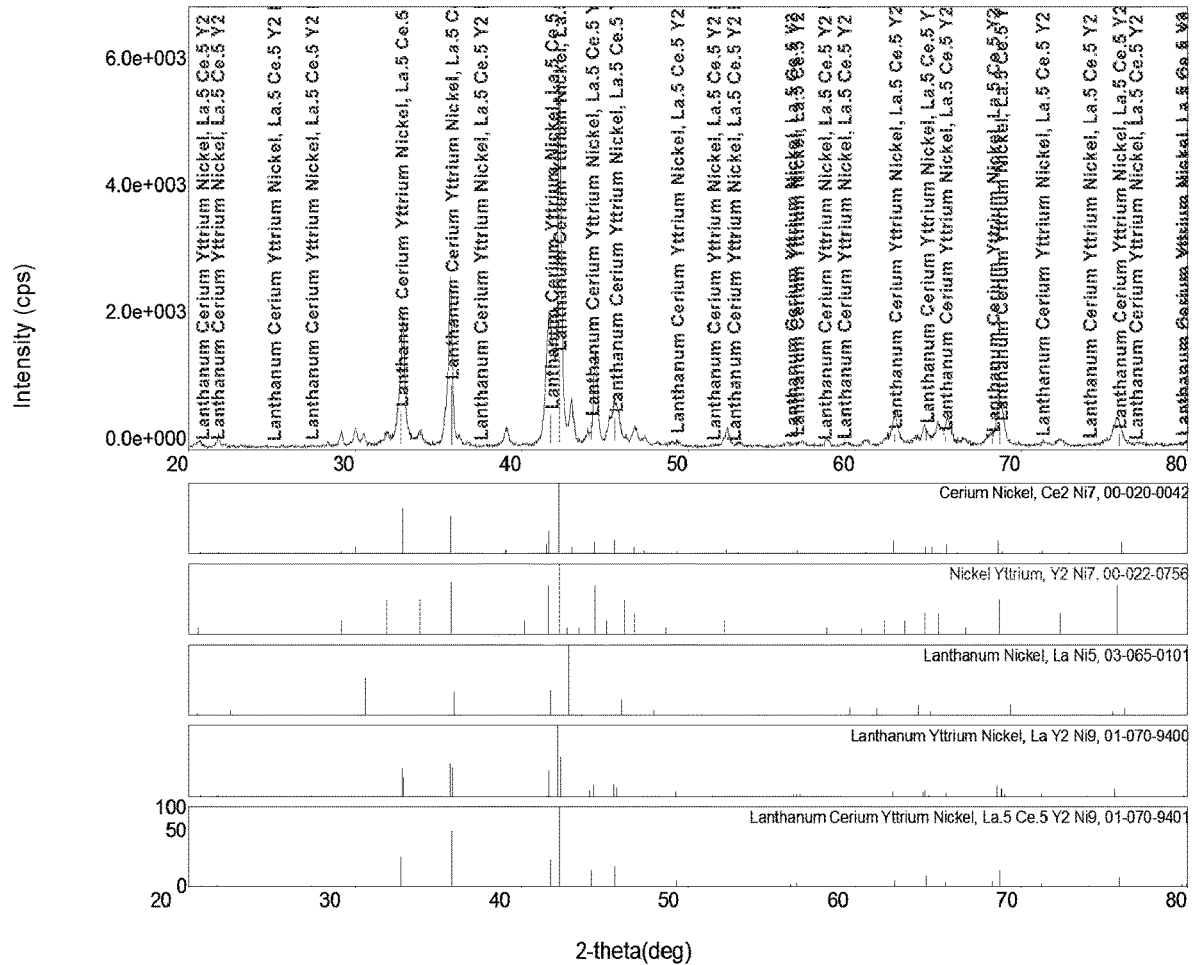
FIG. 1-1 is an XRD pattern of the hydrogen storage alloy, $LaCe_{0.5}Y_{1.5}Ni_{9.7}Mn_{0.5}Al_{0.3}$ (Example A23)

The embodiments of the invention are further described with reference to the examples and drawings. The examples and the descriptions thereof are to illustrate the invention, yet not to limit the invention.

In the following examples:

1. phase structure analyses are performed on X-Ray Diffractometer (XRD), with the following test condition: Cu target, Ka radiation, tube voltage 40 kV, tube current 100 mA, scanning angle 2θ: 20~80°, scanning speed: 3°/min and scanning step: 0.02°.

2. Equipments for measuring hydrogen storage amount include a PCT measuring instrument for hydrogen storage alloy, a thermostatic water bath and an analytical balance. The purity of the hydrogen used in the test is 99.999%.

Measuring procedure includes: crushing the alloy plates, sieving the crushed alloy with a 14 mesh (1200 μm) screen and a 200 mesh (74 μm) screen, collecting about 2.5 g of the alloy powder passing through 200 mesh screen and putting it into a sample container, vacuuming the sample container for 5 min, then charging the container with hydrogen, calibrating the volume of the sample container according to the ideal-gas equation, then vacuuming the sample container for 30 min, keeping the pressure below 0.001 MPa, activating the alloy for 3 times at 353K, then vacuuming the sample container for 2 h, and obtaining a pressure-composition-temperature (PCT) curve at 313K.

3. The rare earth based hydrogen storage alloy is produced by high temperature smelting-rapidly quenching method, the method comprising the following steps: providing components satisfying the stoichiometric ratio of the chemical formula by weighing each raw material accurately, wherein the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert gas Ar to a pressure of 0.055 MPa; smelting the raw materials, keeping the temperature of the smelted raw materials for about 6 minutes and then performing rapidly quenching. The linear speed of the copper roller used for rapidly quenching is 3.4 m/s. The copper roller is cooled with cooling water having a temperature of 25° C.

4. The electrochemical parameters involved in the following examples include: N, denoting the number of cycles; $C_{max}$, denoting the maximum discharge capacity; $S_{100}$, denoting the capacity retention ratio after 100 cycles; $HRD_{350}$, reflecting the discharge ability under a discharge current density ($I_d$) of 350 mA·g$^{-1}$, $LTD_{243}$, denoting the capacity retention ratio at a temperature of 243K; $SD_{72}$, denoting the capacity retention ratio after the battery being stored for 72 hours (self discharge feature).

High-rate discharge capacity ($HRD_{350}$) mainly reflects the dynamics performance of the hydrogen storage electrodes. $HRD_{350}$ is calculated according to the following formula:

$$HRD = \frac{C_d}{C_d + C_{60}} \times 100\%$$

wherein: $C_d$ denotes the discharge capacity measured at a discharge current density ($I_d$) and a cut-off discharge voltage of 1.0V (vs. $Ni(OH)_2$/NiOOH counter electrode), $C_{60}$ denotes the residual discharge capacity measured at a discharge current density of I=60 mA·g$^{-1}$ and a cut-off voltage of 1.0V after the alloy electrode has been fully discharge at high discharge current density ($I_d$). $HRD_{350}$ denotes the HRD measured at a discharge current density ($I_d$) of 350 mA·g$^{-1}$.

$LTD_{243}$ reflects the discharge performance at a low temperature of 243K. The low temperature discharge performance (LTD) is calculated according to the following formula:

$$LTD = \frac{C_T}{C_{298}} \times 100\%$$

In the formula: $C_T$ denotes the maximum discharge capacity at a current density of 70 mA/g at a low temperature (243K), $C_{298}$ denotes the maximum discharge capacity at a current density of 70 mA/g at the normal temperature (298K).

$SD_{72}$ denotes the self-discharge rate measured after the battery has been rested for 72 hours. $SD_{72}$ reflects the self-discharge ability (charge retention ability). The test condition includes: measuring the discharge capacity $C_a$ by charging a battery for 6 h at a rate of 0.2C, resting the battery for 10 min, discharging the battery to 1.0V at a rate of 0.2C, and then measuring the discharge capacity $C_b$, by charging the battery at a rate of 0.2C for 6 h, resting the battery for 72 h, discharging the battery to 1.0 V at a rate of 0.2C, and then measuring the discharge capacity $C_c$ by charging and discharging the battery at a rate of 0.2C. $SD_{72}$, which denotes the charge retention ratio after the battery being rested for 72 h, is calculated by the following formula:

$2C_b/(C_a+C_c) \times 100\%$

Example A1~A23

$A_2B_7$ type $RE_xY_yNi_{z-a-b}Mn_aAl_b$ hydrogen storage alloys in Example A1~A23 were produced by applying the high temperature smelting-rapidly quenching method.

The alloys in Example A13 and Example A14 were produced by using the same raw material composition. The alloy in Example A13 was produced by applying the above-mentioned high temperature smelting-rapidly quenching method, the method including the following steps: providing components satisfying the stoichiometric ratio of the chemical formula by weighing each raw material accurately (the raw materials with high burning loss were increased by appropriate amount), wherein the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert gas Ar to a pressure of 0.055 MPa; smelting the raw materials, keeping the temperature of the smelted raw materials for about 6 minutes and then performing rapidly quenching. The linear speed of the copper roller used for rapidly quenching was 3.4 m/s. The copper roller was cooled with cooling water having a temperature of 25° C.

The alloy in Example A14 was also produced by applying the above-mentioned high temperature smelting-rapidly quenching method. Besides, an annealing step was added to the producing method. Specifically, the method including the following steps: providing components satisfying the stoichiometric ratio of the chemical formula by weighing each raw material accurately, wherein the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert gas Ar to a pressure of 0.055 MPa; smelting the raw materials, keeping the temperature of the smelted raw materials for about 6 minutes and then performing rapidly quenching. The linear speed of the copper roller used for rapidly quenching was 3.4 m/s. The copper roller was cooled with cooling water having a temperature of 25° C. The rapidly solidified alloy sheet was further annealed at 750° C. for 8 h under vacuum or inert gas atmosphere.

The Ml in Example A20 denotes Lanthanum-rich mischmetal, La accounted for about 64%, Ce accounted for about 25%, Pr accounted for about 3% and Nd accounted for about 8%.

The test method for electrodes includes: mechanically crushing the alloys of Example A1~A23 into 200-300 mesh alloy powder, mixing the alloy powder with carbonyl nickel powder by a weight ratio of 1:4, tabletting the mixed powder with a pressure of 16 MPa to form φ15 mm a MH electrodes plate, placing an electrode plate between two pieces of nickel foams, meanwhile, placing nickel belts between the nickel foams as the battery tabs, pressing the nickel forms with a pressure of 16 MPa to form a hydrogen storage anode (MH electrode) for testing, spot welding the edge of the electrode to make sure the electrode and the nickel forms were in close contact.

An open two-electrode system was used to test the electrochemical performance, native electrode was MH electrode; positive electrode was sintered $Ni(OH)_2$/NiOOH electrode with surplus capacity; electrolyte was 6 mol·L$^{-1}$ KOH solution. The assembled battery was being rested for 24 h, and then tested on a LAND battery testing equipment employing galvanostatic method to test their electrochemical performance (such as activating times, maximum capacity, high rate discharge capacity HRD, cycling stability, etc.). The environmental temperature during the test is 298K. The charge current density was 70 mA·g$^{-1}$; the charging time was 6 h; the discharge current density was 70 mA·g$^{-1}$; the discharge cut-off voltage was 1.0V, the interval between each charge and discharge was 10 min.

The $A_2B_7$ type $RE_xY_yNi_{z-a-b}Mn_aAl_b$ hydrogen storage alloys of Example A1~A23 and their electrochemical performance are listed in Table 1.

TABLE 1

$A_2B_7$ type $RE_xY_yNi_{z-a-b}Mn_aAl_b$ hydrogen storage alloy and their electrochemical performance

| | | | electrochemical performances | | | | |
|---|---|---|---|---|---|---|---|
| Example | hydrogen storage alloy | N | $C_{max}$ (mAh·g$^{-1}$) | $S_{100}$ (%) | $HRD_{350}$ (%) | $LTD_{243}$ (%) | $SD_{72}$ |
| A1 | $LaY_2Ni_{8.7}Mn_{0.5}Al_{0.3}$ | 3 | 381 | 95 | 93 | 81 | 80 |
| A2 | $LaY_2Ni_{9.7}Mn_{0.5}Al_{0.3}$ | 2 | 386 | 93 | 91 | 82 | 83 |
| A3 | $LaY_2Ni_{10}Mn_{0.5}Al_{0.3}$ | 2 | 375 | 93 | 91 | 86 | 84 |
| A4 | $LaY_2Ni_{10}Mn_{0.5}$ | 2 | 378 | 93 | 93 | 82 | 81 |
| A5 | $LaY_2Ni_{9.5}Mn$ | 1 | 367 | 91 | 90 | 85 | 82 |
| A6 | $La_{0.5}Y_{2.5}Ni_{9.5}Mn$ | 1 | 352 | 95 | 92 | 87 | 81 |
| A7 | $La_{0.5}Y_{2.5}Ni_{9.5}Al$ | 3 | 337 | 98 | 87 | 85 | 86 |
| A8 | $La_2YNi_{9.5}Mn$ | 3 | 365 | 88 | 89 | 82 | 85 |
| A9 | $La_{2.5}Y_{0.5}Ni_{9.5}Mn$ | 3 | 351 | 85 | 85 | 79 | 87 |
| A10 | $LaY_2Ni_{10}Al_{0.5}$ | 3 | 346 | 98 | 91 | 85 | 83 |
| A11 | $LaY_2Ni_{9.3}MnAl_{0.2}$ | 1 | 352 | 93 | 90 | 86 | 83 |
| A12 | $LaY_2Ni_9MnAl_{0.5}$ | 2 | 349 | 96 | 87 | 83 | 85 |
| A13 | $LaY_2Ni_{9.5}Mn_{0.5}Al_{0.5}$ | 2 | 362 | 90 | 89 | 84 | 80 |
| A14 | $LaY_2Ni_{9.5}Mn_{0.5}Al_{0.5}$ | 3 | 369 | 92 | 91 | 86 | 83 |
| A15 | $LaY_{1.5}Ce_{0.5}Ni_{9.5}Mn_{0.5}Al_{0.5}$ | 3 | 357 | 93 | 88 | 81 | 83 |
| A16 | $LaY_{1.5}Sm_{0.5}Ni_{9.5}Mn_{0.5}Al_{0.5}$ | 3 | 343 | 95 | 91 | 86 | 85 |
| A17 | $La_{0.8}Ce_{0.2}Y_2Ni_{9.5}Mn_{0.5}Al_{0.5}$ | 3 | 363 | 93 | 90 | 85 | 80 |
| A18 | $La_{0.8}Ce_{0.2}Y_{1.5}Sm_{0.5}Ni_{9.5}Mn_{0.5}Al_{0.5}$ | 3 | 354 | 96 | 84 | 83 | 80 |
| A19 | $La_{0.8}Ce_{0.2}Y_{1.5}Nd_{0.5}Ni_{9.5}Mn_{0.5}Al_{0.5}$ | 3 | 352 | 97 | 82 | 83 | 81 |
| A20 | $MlY_2Ni_{9.5}Mn_{0.5}Al_{0.5}$ | 3 | 352 | 96 | 90 | 85 | 83 |
| A21 | $La_{0.8}Ce_{0.2}Y_2Ni_{8.5}Mn_{1.5}Al_{0.5}$ | 3 | 353 | 92 | 88 | 86 | 82 |
| A22 | $La_{0.8}Ce_{0.2}Y_2Ni_{7.5}Mn_{2.5}Al_{0.5}$ | 3 | 342 | 93 | 82 | 87 | 85 |
| A23 | $LaCe_{0.5}Y_{1.5}Ni_{9.7}Mn_{0.5}Al_{0.3}$ | 3 | 361 | 90 | 85 | 87 | 86 |

According to Table 1, compared with the $LaY_2Ni_{9.5}Mn_{0.5}Al_{0.5}$ alloy of Example A13, the alloy electrode of Example A14, which has been subjected to annealing heat treatment, has increased electrochemical capacity, and improved cycle life, discharge capacity, low temperature discharge characteristic, as well as self-discharge performance.

The microstructure of the $LaCe_{0.5}Y_{1.5}Ni_{9.7}Mn_{0.5}Al_{0.3}$ alloy of Example A23 was analyzed by an X-ray diffractometer. FIG. 1-1 shows an XRD pattern exported from the X-ray diffractometer. As shown in FIG. 1-1, the alloy may contains $Ce_2Ni_7$ phase, $Y_2Ni_7$ phase, $LaNi_5$ phase, $LaY_2Ni_9$ phase or $La_{0.5}Ce_{0.5}Y_2Ni_9$ phase.

Figures 1, 2:
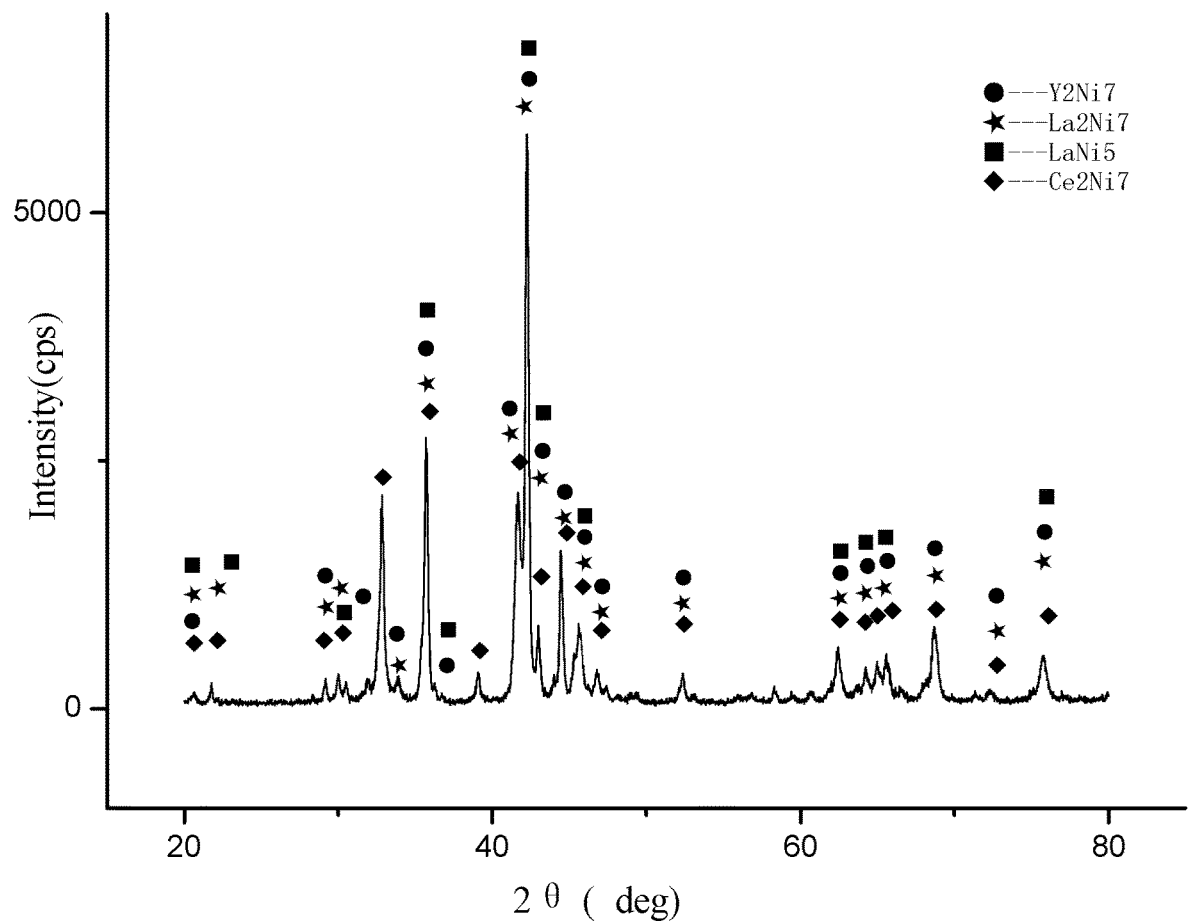

FIG. 1-2 shows a redrawn XRD pattern of hydrogen storage alloy according to the original XRD data of Example A23. As shown in the figure, the alloy contains $Y_2Ni_7$ phase, $La_2Ni_7$ phase, $LaNi_5$ phase and $Ce_2Ni_7$ phase.

Figures 1, 2, 3:
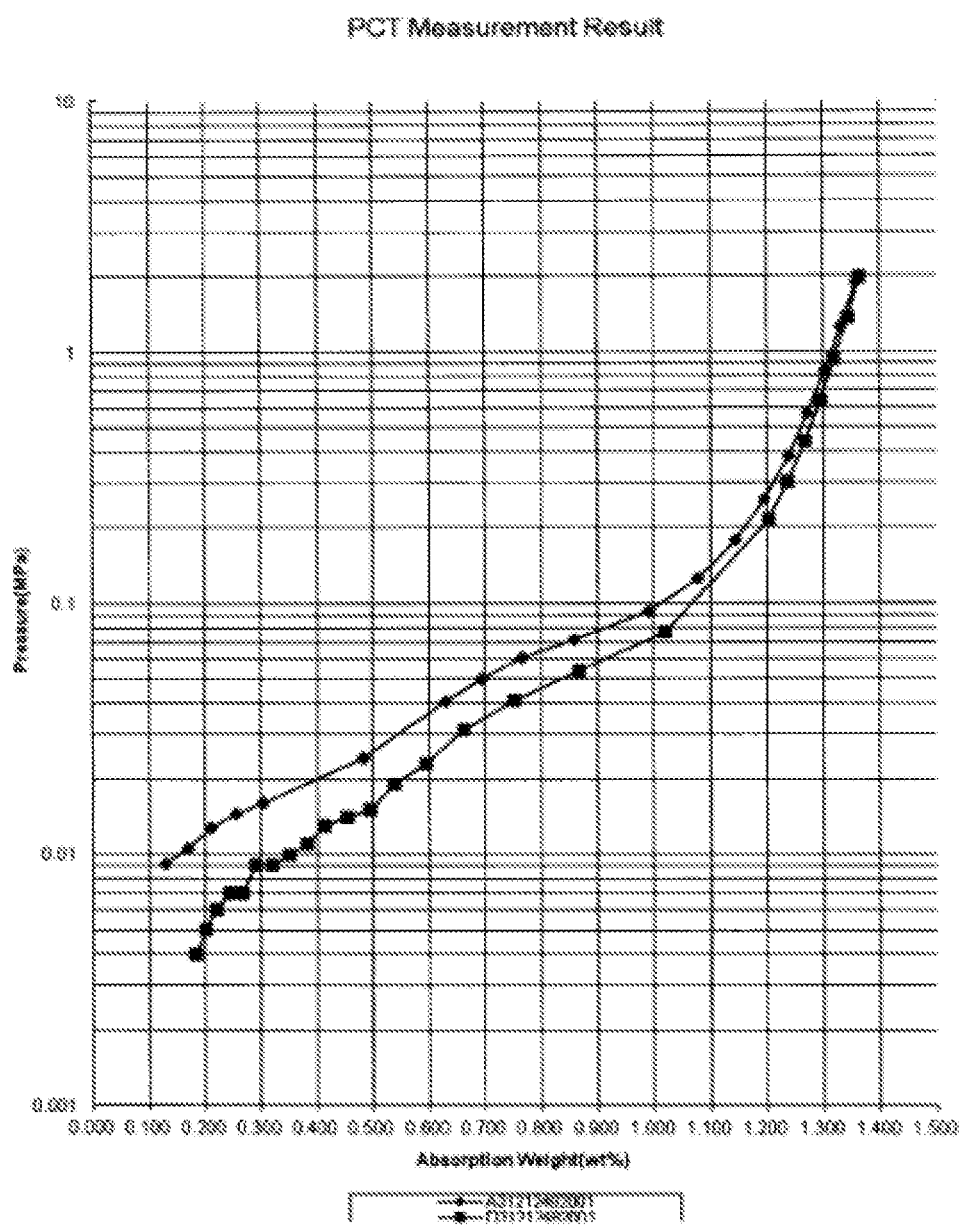
Figures 1, 2:
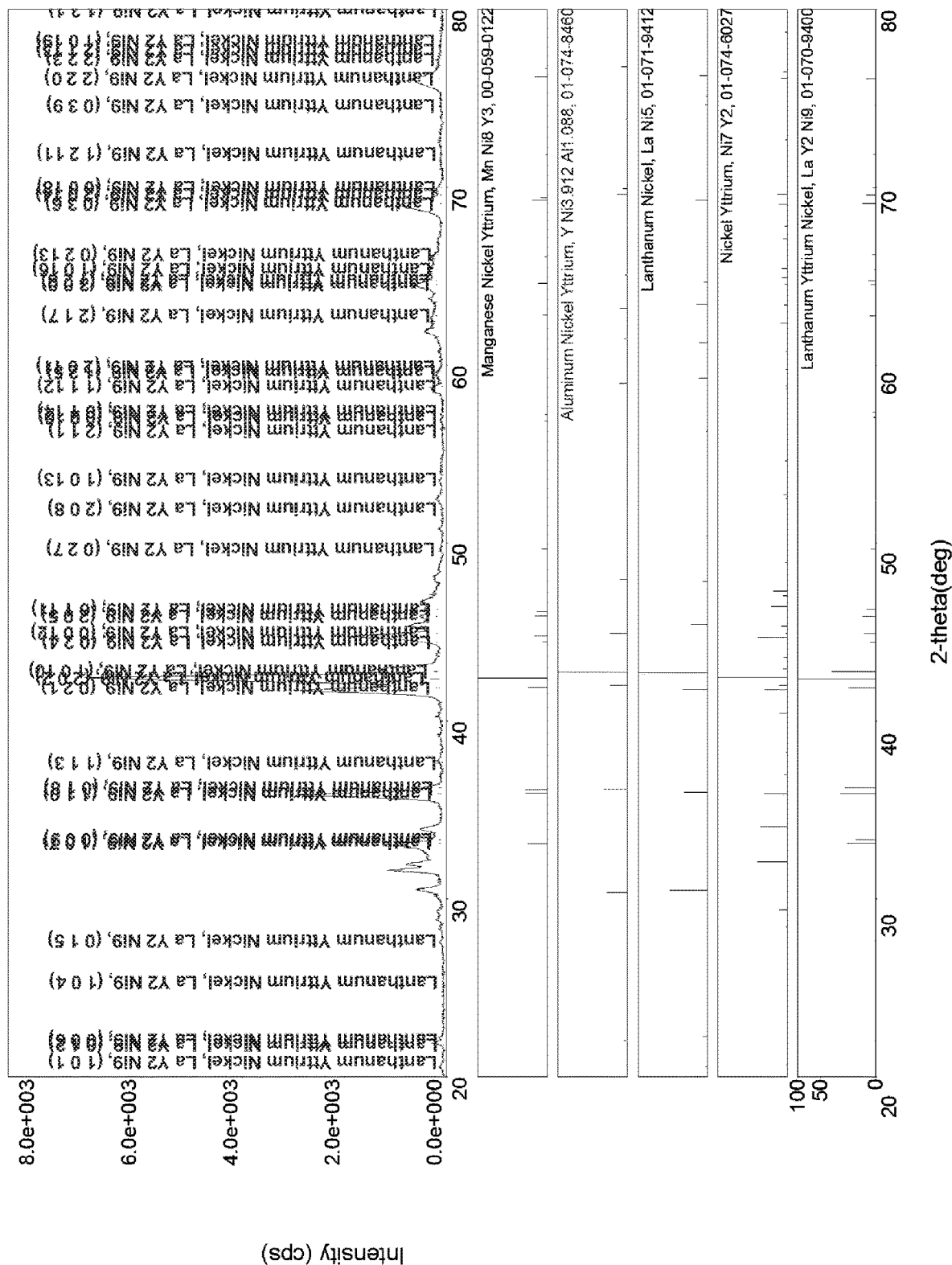
Figure 2:
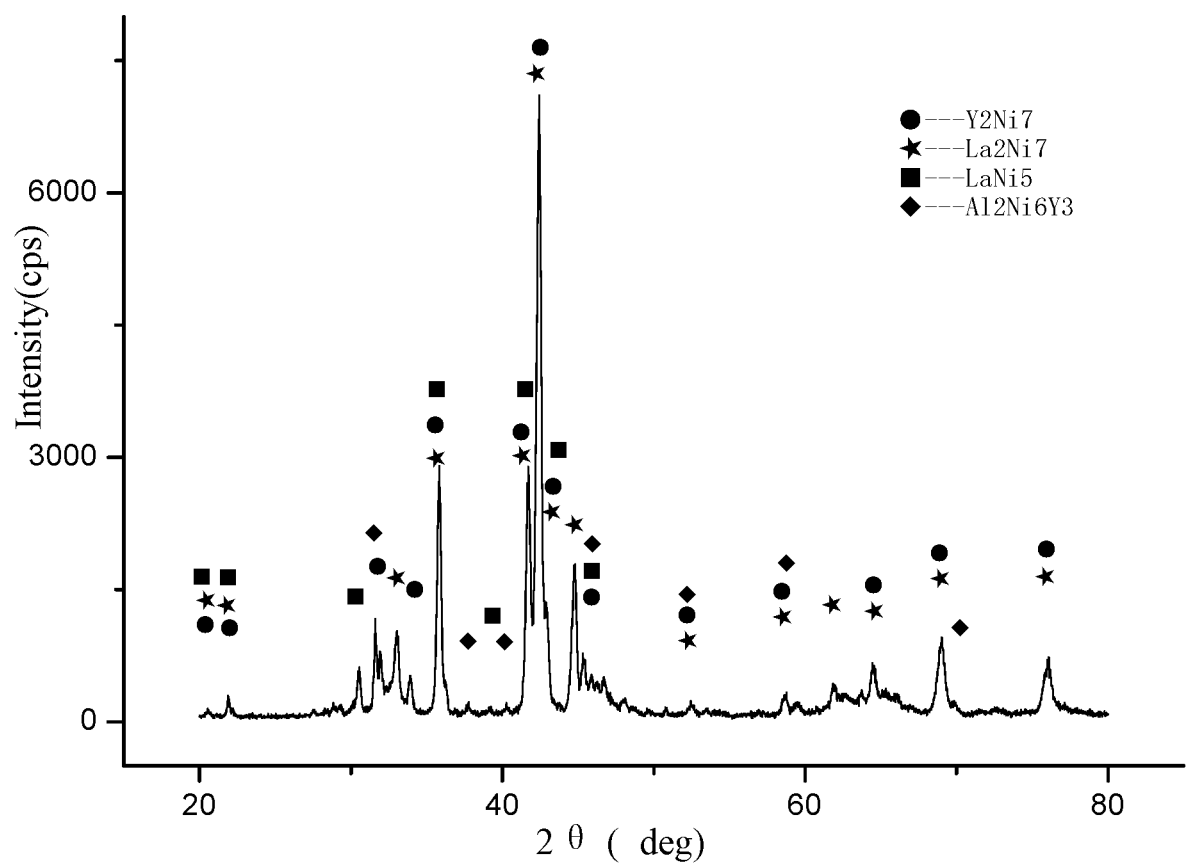
Figures 2, 3:
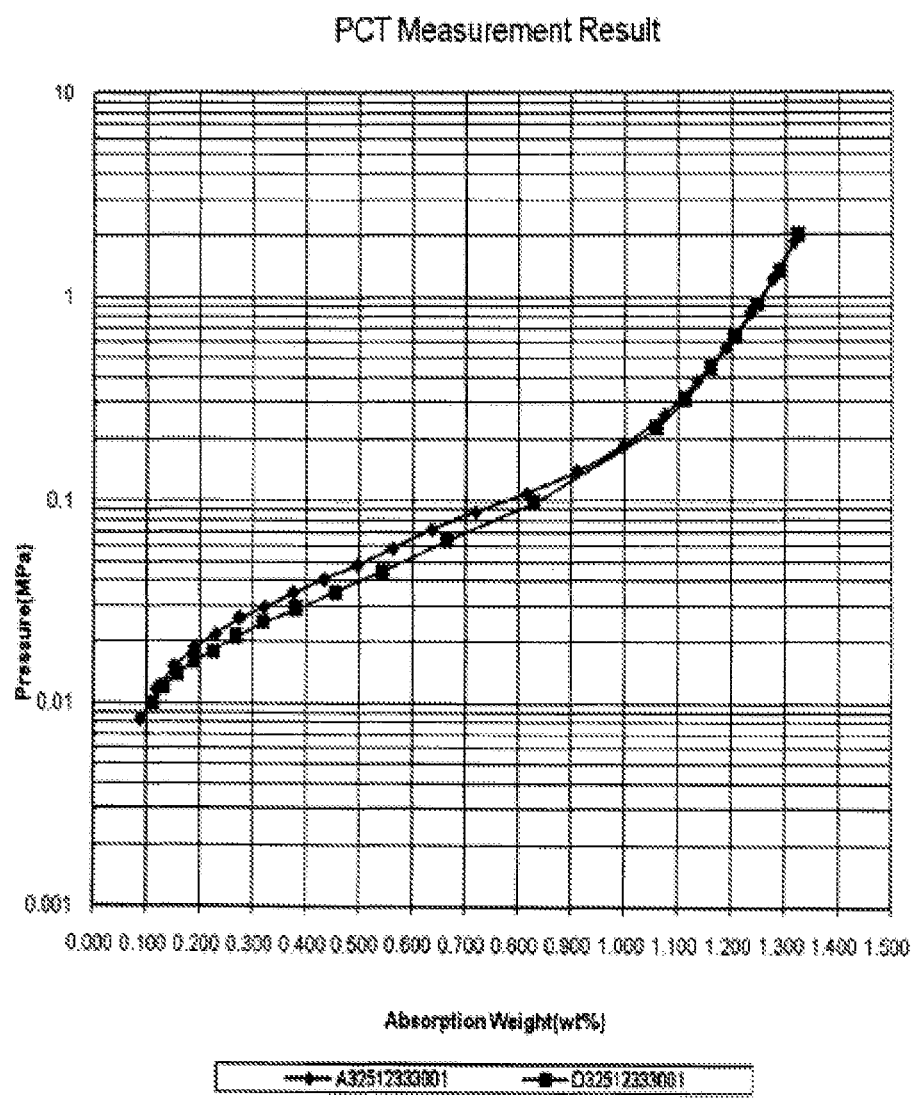
Figures 1, 3:
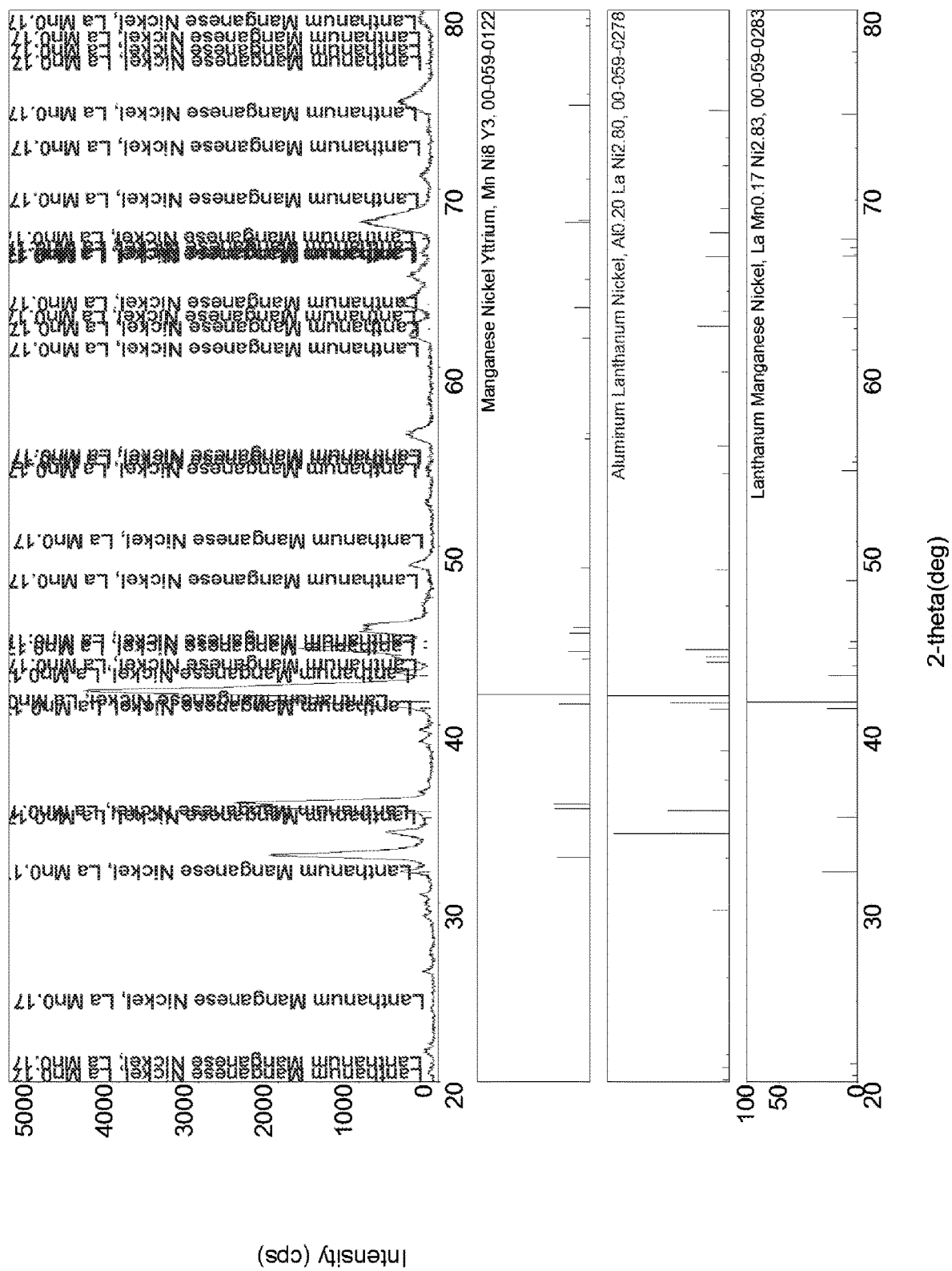
Figures 2, 3:
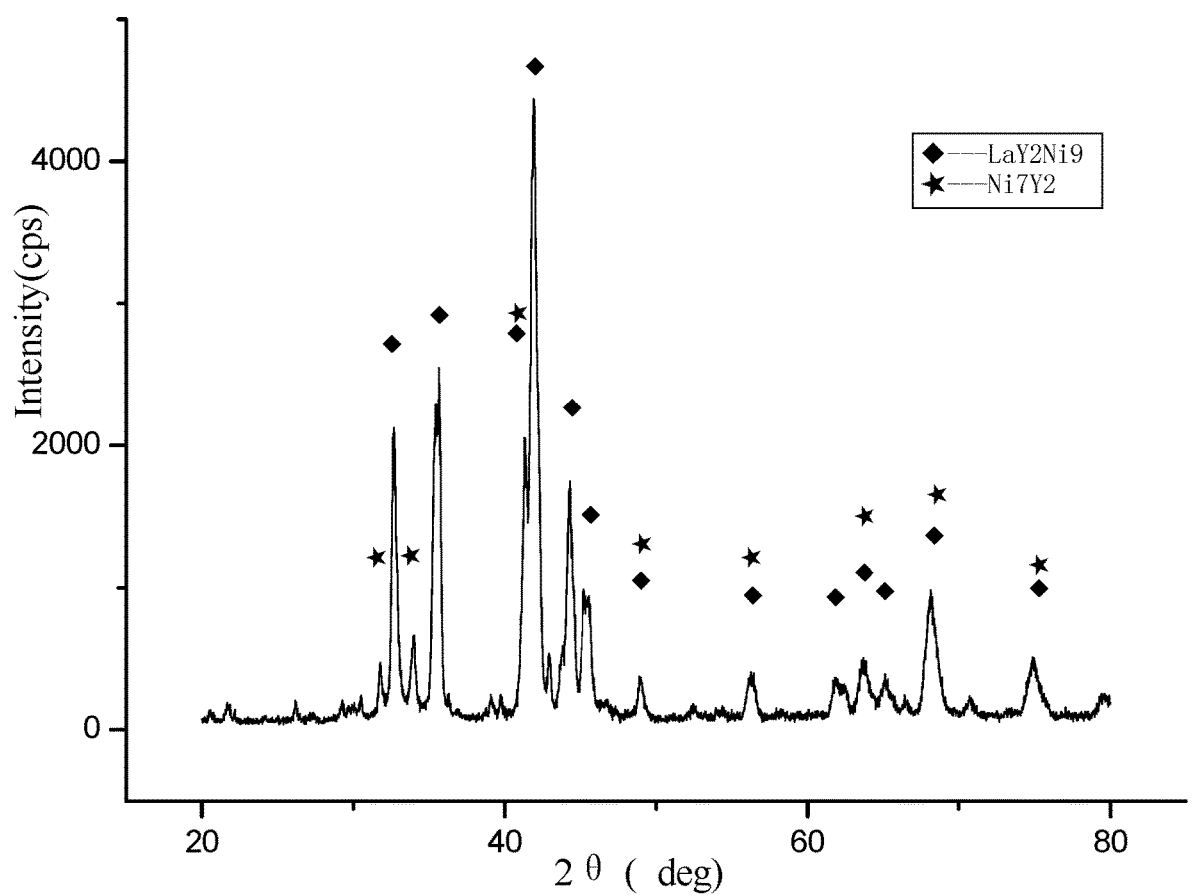

FIG. 1-3 is a pressure-composition-temperature curve (P-c-T curve) of $LaY_2Ni_{9.5}Mn_{0.5}Al_{0.5}$ alloy of Example A13 measured at 313K by applying Sievert method. As shown in FIG. 1-3, the maximum hydrogen storage capacity of the alloy could reach 1.36 wt % and the hydrogen desorption plateau pressure is about 0.05 MPa. The A31212482001 curve denotes the hydrogen absorption curve of the alloy and the D31212482001 curve denotes the hydrogen desorption curve of the alloy.

Example B1~B22

The $A_5B_{19}$ type $RE_xY_yNi_{z-a-b}Mn_aAl_b$ of Example B1~B22 were prepared by adopting the high-temperature smelting rapidly quenching method.

The alloy of Example B13 and Example B14 were prepared from the same raw materials. The alloy of Example B13 was prepared by applying the abovementioned high-temperature smelting rapidly quenching method. Specifically, the method including the following steps: providing components satisfying the stoichiometric ratio of the chemical formula by weighing each raw material accurately, (the raw materials with high burning loss were increased by appropriate amount), wherein the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert gas Ar to a pressure of 0.055 MPa; smelting the raw materials, keeping the temperature of the smelted raw materials for about 6 minutes and then performing rapidly quenching. The linear speed of the copper roller used for rapidly quenching was 3.4 m/s. The copper roller was cooled with cooling water having a temperature of 25° C.

The alloy of Example B14 was prepared by applying the abovementioned high-temperature smelting rapidly quenching method. Additionally, an annealing heat treatment step was added in the preparing process. Specifically, the method including the following steps: providing components satisfying the stoichiometric ratio of the chemical formula by weighing each raw material accurately, (the raw materials with high burning loss were increased by appropriate amount), wherein the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert gas Ar to a pressure of 0.055 MPa; smelting the raw materials, keeping the temperature of the smelted raw materials for about 6 minutes and then performing rapidly quenching. The linear speed of the copper roller used for rapidly quenching was 3.4 m/s. The copper roller was cooled with cooling water having a temperature of 25° C. The rapidly solidified alloy sheet was further annealed at 750° C. for 8 h under vacuum or inert gas atmosphere.

The Ml in Example B20 denotes Lanthanum-rich mischmetal, La accounted for about 64%, Ce accounted for about 25%, Pr accounted for about 3% and Nd accounted for about 8%.

The method for preparing the test electrode was same as that of Example A1~A23.

The method for testing electrochemical performance was same as that of Example A1~A23.

The $A_5B_{19}$ type $RE_xY_yNi_{z-a-b}Mn_aAl_b$ hydrogen storage alloys of Example B1~B22 and their electrochemical performance are listed in the following table.

plateau pressure is about 0.1 MPa. The A32512333001 curve in denotes the hydrogen absorption curve of the alloy and D32512333001 curve denotes the hydrogen desorption curve of the alloy.

Example C1~C22

The $AB_3$ type $RE_xY_yNi_{z-a-b}Mn_aAl_b$ hydrogen storage alloy of Example C1~C22 were prepared by adopting the high-temperature smelting rapidly quenching method.

The alloy of Example C13 and Example C14 were prepared from the same raw materials. The alloy of Example C13 was prepared by applying the abovementioned high-temperature smelting rapidly quenching method. Specifi-

TABLE 2

$A_5B_{19}$ type $RE_xY_yNi_{z-a-b}Mn_aAl_b$ hydrogen storage alloy and their electrochemical performance

| | | | | electrochemical performances | | | |
|---|---|---|---|---|---|---|---|
| Example | hydrogen storage alloy | N | $C_{max}$ (mAh·g$^{-1}$) | $S_{100}$ (%) | $HRD_{350}$ (%) | $LTD_{243}$ (%) | $SD_{72}$ |
| B1 | $LaY_2Ni_{10.2}Mn_{0.5}Al_{0.3}$ | 3 | 372 | 93 | 95 | 80 | 83 |
| B2 | $LaY_2Ni_{10.6}Mn_{0.5}Al_{0.3}$ | 2 | 383 | 90 | 91 | 82 | 81 |
| B3 | $LaY_2Ni_{11.7}Mn_{0.5}Al_{0.3}$ | 2 | 365 | 95 | 90 | 83 | 85 |
| B4 | $LaY_2Ni_{10.6}Mn_{0.8}$ | 2 | 376 | 93 | 93 | 80 | 82 |
| B5 | $LaY_2Ni_{9.9}Mn_{1.5}$ | 1 | 367 | 91 | 90 | 85 | 81 |
| B6 | $La_{0.5}Y_{2.5}Ni_{9.9}Mn_{1.5}$ | 3 | 351 | 94 | 93 | 87 | 82 |
| B7 | $La_{2.0}YNi_{9.9}Mn_{1.5}$ | 2 | 361 | 92 | 89 | 84 | 85 |
| B8 | $La_{2.5}Y_{0.5}Ni_{9.9}Mn_{1.5}$ | 1 | 353 | 89 | 87 | 80 | 87 |
| B9 | $LaY_2Ni_{9.9}Al_{1.5}$ | 3 | 330 | 98 | 88 | 83 | 89 |
| B10 | $LaY_2Ni_{10.6}Al_{0.8}$ | 3 | 342 | 96 | 91 | 87 | 83 |
| B11 | $LaY_2Ni_{9.4}Mn_{1.5}Al_{0.5}$ | 1 | 362 | 93 | 90 | 83 | 80 |
| B12 | $LaY_2Ni_{10.1}MnAl_{0.3}$ | 2 | 383 | 90 | 87 | 85 | 82 |
| B13 | $LaY_2Ni_{9.9}MnAl_{0.5}$ | 2 | 380 | 92 | 89 | 81 | 80 |
| B14 | $LaY_2Ni_{9.9}MnAl_{0.5}$ | 3 | 383 | 93 | 91 | 86 | 83 |
| B15 | $LaY_{1.5}Ce_{0.5}Ni_{9.9}MnAl_{0.5}$ | 3 | 372 | 96 | 88 | 81 | 85 |
| B16 | $LaY_{1.5}Sm_{0.5}Ni_{9.9}MnAl_{0.5}$ | 3 | 363 | 95 | 90 | 85 | 83 |
| B17 | $La_{0.8}Ce_{0.2}Y_2Ni_{9.9}MnAl_{0.5}$ | 3 | 370 | 93 | 90 | 82 | 80 |
| B18 | $La_{0.8}Ce_{0.2}Y_{1.5}Sm_{0.5}Ni_{9.9}MnAl_{0.5}$ | 3 | 354 | 96 | 87 | 85 | 83 |
| B19 | $La_{0.8}Ce_{0.2}Y_{1.5}Nd_{0.5}Ni_{9.9}MnAl_{0.5}$ | 3 | 351 | 97 | 87 | 83 | 85 |
| B20 | $MlY_2Ni_{9.9}MnAl_{0.5}$ | 3 | 360 | 94 | 90 | 81 | 82 |
| B21 | $La_{0.8}Ce_{0.2}Y_2Ni_{9.4}Mn_{1.5}Al_{0.5}$ | 3 | 362 | 91 | 87 | 85 | 83 |
| B22 | $La_{0.8}Ce_{0.2}Y_2Ni_{7.9}Mn_3Al_{0.5}$ | 3 | 350 | 93 | 82 | 86 | 85 |

According to Table 2, compared with the $LaY_2Ni_{9.9}MnAl_{0.5}$ alloy of Example B13, the alloy electrode of Example B14, which has been subjected to annealing heat treatment, has increased electrochemical capacity, and improved cycle life, discharge capacity, low temperature discharge characteristic, as well as self-discharge performance.

The microstructure of the $LaY_2Ni_{10.6}Mn_{0.5}Al_{0.3}$ alloy (Example B2) was analyzed by an X-ray diffractometer. FIG. 2-1 shows an XRD pattern exported from the X-ray diffractometer. As shown in FIG. 2-1, the alloy may contain $MnNi_8Y_3$ phase, $YNi_{3.912}Al_{1.088}$ phase, $LaNi_5$ phase, $Ni_7Y_2$ phase, or $LaY_2Ni_9$ phase, etc. The alloy may also contain $YNi_3$ phase, $Y_2Ni_7$ phase, $LaY_2Ni_9$ phase, $LaNi_5$ phase, $Pr_5Co_{19}$ phase or $Ce_5Co_{19}$ phase, etc.

FIG. 2-2 shows a redrawn XRD pattern of hydrogen storage alloy according to the original XRD data of Example B2. As shown in the figure, the alloy contains $Y_2Ni_7$, $La_2Ni_7$, $LaNi_5$ and $Al_2Ni_6Y_3$ phase.

FIG. 2-3 is a pressure-composition-temperature curve (P-c-T curve) of $LaY_2Ni_{10.6}Mn_{0.5}Al_{0.3}$ alloy (Example B2) measured at 313K by applying Sievert method. As shown in FIG. 2-3, the maximum hydrogen storage capacity of the alloy could reach 1.33 wt % and the hydrogen desorption cally, the method including the following steps: providing components satisfying the stoichiometric ratio of the chemical formula by weighing each raw material accurately (the raw materials with high burning loss were increased by appropriate amount), wherein the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert gas Ar to a pressure of 0.055 MPa; smelting the raw materials, keeping the temperature of the smelted raw materials for about 6 minutes and then performing rapidly quenching. The linear speed of the copper roller used for rapidly quenching was 3.4 m/s. The copper roller was cooled with cooling water having a temperature of 25° C.

The alloy of Example C14 was prepared by applying the abovementioned high-temperature smelting rapidly quenching method. Additionally, an annealing heat treatment step was added in the preparing process. Specifically, the method including the following steps: providing components satisfying the stoichiometric ratio of the chemical formula by weighing each raw material accurately (the raw materials with high burning loss were increased by appropriate amount), wherein the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert gas Ar to a pressure of 0.055 MPa; smelting the raw materials, keeping the temperature of the smelted raw materials for about 6 minutes and then performing rapidly quenching. The linear speed of the copper roller used for rapidly quenching was 3.4 m/s. The copper roller was cooled with cooling water having a temperature of 25° C. The rapidly solidified alloy sheet was further annealed at 750° C. for 8 h under vacuum or inert gas atmosphere.

The Ml in Example C20 denotes Lanthanum-rich mischmetal, La accounted for about 64%, Ce accounted for about 25%, Pr accounted for about 3% and Nd accounted for about 8%.

The method for preparing the test electrode was same as that of Example A1~A23.

The method for testing electrochemical performance was same as that of Example A1~A23.

The $RE_xY_yNi_{z-a-b}Mn_aAl_b$ hydrogen storage alloys of Example C1~C22 and their electrochemical performance are listed in the following table 3.

FIG. 3-2 shows a redrawn XRD pattern of hydrogen storage alloy according to the original XRD data of Example C13. As shown in the figure, the alloy contains $LaY_2Ni_9$ phase or $Ni_7Y_2$ phase.

Example D1~D38

The $RE_xY_yNi_{z-a-b-c}Mn_aAl_bM_c$ hydrogen storage alloy of Example D1~D38 were prepared by adopting the high-temperature smelting rapidly quenching method.

The alloy of Example D7 and D8 as well as Example D28 and D29 were prepared from the same raw materials. The alloy of Example D7 and D28 were prepared by applying the abovementioned high-temperature smelting rapidly quenching method. Specifically, the method including the following steps: providing components satisfying the stoichiometric ratio of the chemical formula by weighing each raw material accurately (the raw materials with high burning loss were increased by appropriate amount), wherein the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert

TABLE 3

$RE_xY_yNi_{z-a-b}Mn_aAl_b$ hydrogen storage alloy and their electrochemical performance

| Example | hydrogen storage alloy | N | $C_{max}$ (mAh·g$^{-1}$) | $S_{100}$ (%) | $HRD_{350}$ (%) | $LTD_{243}$ (%) | $SD_{72}$ |
|---|---|---|---|---|---|---|---|
| C1 | $LaY_2Ni_{7.7}Mn_{0.5}Al_{0.3}$ | 2 | 345 | 92 | 89 | 80 | 81 |
| C2 | $LaY_2Ni_{8.2}Mn_{0.5}Al_{0.3}$ | 2 | 362 | 93 | 91 | 81 | 83 |
| C3 | $LaY_2Ni_{8.5}Mn_{0.5}Al_{0.3}$ | 3 | 369 | 95 | 93 | 82 | 80 |
| C4 | $LaY_2Ni_{8.5}Mn_{0.5}$ | 2 | 367 | 93 | 93 | 80 | 78 |
| C5 | $LaY_2Ni_8Mn$ | 1 | 357 | 91 | 90 | 80 | 82 |
| C6 | $La_{0.5}Y_{2.5}Ni_8Mn$ | 3 | 351 | 97 | 93 | 85 | 80 |
| C7 | $La_{2.0}YNi_8Mn$ | 2 | 359 | 95 | 89 | 82 | 82 |
| C8 | $La_{2.5}Y_{0.5}Ni_8Mn$ | 1 | 354 | 91 | 87 | 79 | 85 |
| C9 | $LaY_2Ni_8Al$ | 3 | 342 | 98 | 87 | 81 | 85 |
| C10 | $LaY_2Ni_{8.5}Al_{0.5}$ | 3 | 339 | 98 | 91 | 81 | 83 |
| C11 | $LaY_2Ni_{7.7}MnAl_{0.2}$ | 1 | 342 | 93 | 90 | 83 | 83 |
| C12 | $LaY_2Ni_{7.5}MnAl_{0.5}$ | 2 | 332 | 96 | 87 | 81 | 85 |
| C13 | $LaY_2Ni_8Mn_{0.5}Al_{0.5}$ | 2 | 352 | 90 | 89 | 80 | 80 |
| C14 | $LaY_2Ni_8Mn_{0.5}Al_{0.5}$ | 3 | 362 | 91 | 92 | 83 | 82 |
| C15 | $LaY_{1.5}Ce_{0.5}Ni_8Mn_{0.5}Al_{0.5}$ | 3 | 345 | 93 | 88 | 82 | 85 |
| C16 | $LaY_{1.5}Sm_{0.5}Ni_8Mn_{0.5}Al_{0.5}$ | 3 | 335 | 95 | 92 | 80 | 86 |
| C17 | $La_{0.8}Ce_{0.2}Y_2Ni_8Mn_{0.5}Al_{0.5}$ | 3 | 357 | 92 | 90 | 80 | 82 |
| C18 | $La_{0.8}Ce_{0.2}Y_{1.5}Sm_{0.5}Ni_8Mn_{0.5}Al_{0.5}$ | 3 | 351 | 97 | 86 | 82 | 86 |
| C19 | $La_{0.8}Ce_{0.2}Y_{1.5}Nd_{0.5}Ni_8Mn_{0.5}Al_{0.5}$ | 3 | 348 | 98 | 87 | 82 | 87 |
| C20 | $MlY_2Ni_8Mn_{0.5}Al_{0.5}$ | 3 | 352 | 96 | 90 | 81 | 83 |
| C21 | $La_{0.8}Ce_{0.2}Y_2Ni_7Mn_{1.5}Al_{0.5}$ | 3 | 343 | 90 | 87 | 83 | 82 |
| C22 | $La_{0.8}Ce_{0.2}Y_2Ni_{6.5}Mn_2Al_{0.5}$ | 3 | 337 | 92 | 89 | 85 | 86 |

According to Table 3, compared with the $LaY_2Ni_8Mn_{0.5}Al_{0.5}$ alloy of Example C13, the alloy electrode of Example C14, which has been subjected to annealing heat treatment, has increased electrochemical capacity, and improved cycle life, discharge capacity, low temperature discharge characteristic, as well as self-discharge performance.

The microstructure of the $LaY_2Ni_8Mn_{0.5}Al_{0.5}$ alloy (Example C13) was analyzed by an X-ray diffractometer. FIG. 3-1 shows an XRD pattern exported from the X-ray diffractometer. As shown in FIG. 3-1, the alloy may contain $MnNi_8Y_3$ phase, $Al_{0.20}LaNi_{2.80}$ phase or $LaMn_{0.17}Ni_{2.83}$ phase, etc. The alloy may also contain $YNi_3$ phase or $LaNi_3$ phase, etc.

gas Ar to a pressure of 0.055 MPa; smelting the raw materials, keeping the temperature of the smelted raw materials for about 6 minutes and then performing rapidly quenching. The linear speed of the copper roller used for rapidly quenching was 3.4 m/s. The copper roller was cooled with cooling water having a temperature of 25° C.

The alloy of Example D8 and D29 were prepared by applying the abovementioned high-temperature smelting rapidly quenching method. Additionally, an annealing heat treatment step was added in the preparing process. Specifically, the method including the following steps: providing components satisfying the stoichiometric ratio of the chemical formula by weighing each raw material accurately (the raw materials with high burning loss were increased by appropriate amount), wherein the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert gas Ar to a pressure of 0.055 MPa; smelting the raw materials, keeping the temperature of the smelted raw materials for about 6 minutes and then performing rapidly quenching. The linear speed of the copper roller used for rapidly quenching was 3.4 m/s. The copper roller was cooled with cooling water having a temperature of 25° C. The rapidly solidified alloy sheet was further annealed at 750° C. for 8 h under vacuum or inert gas atmosphere.

The Ml in Example D37 denotes Lanthanum-rich mischmetal, La accounted for about 64%, Ce accounted for about 25%, Pr accounted for about 3% and Nd accounted for about 8%.

The method for preparing the test electrode was same as that of Example A1~A23.

The method for testing electrochemical performance was same as that of Example A1~A23.

The $RE_xY_yNi_{z-a-b-c}Mn_aAl_bM_c$ hydrogen storage alloys of Example D1~D38 and their electrochemical performance are listed in the following table.

ing heat treatment, have increased electrochemical capacity, and improved cycle life, discharge capacity, low temperature discharge characteristic, as well as self-discharge performance.

Figures 1, 4:
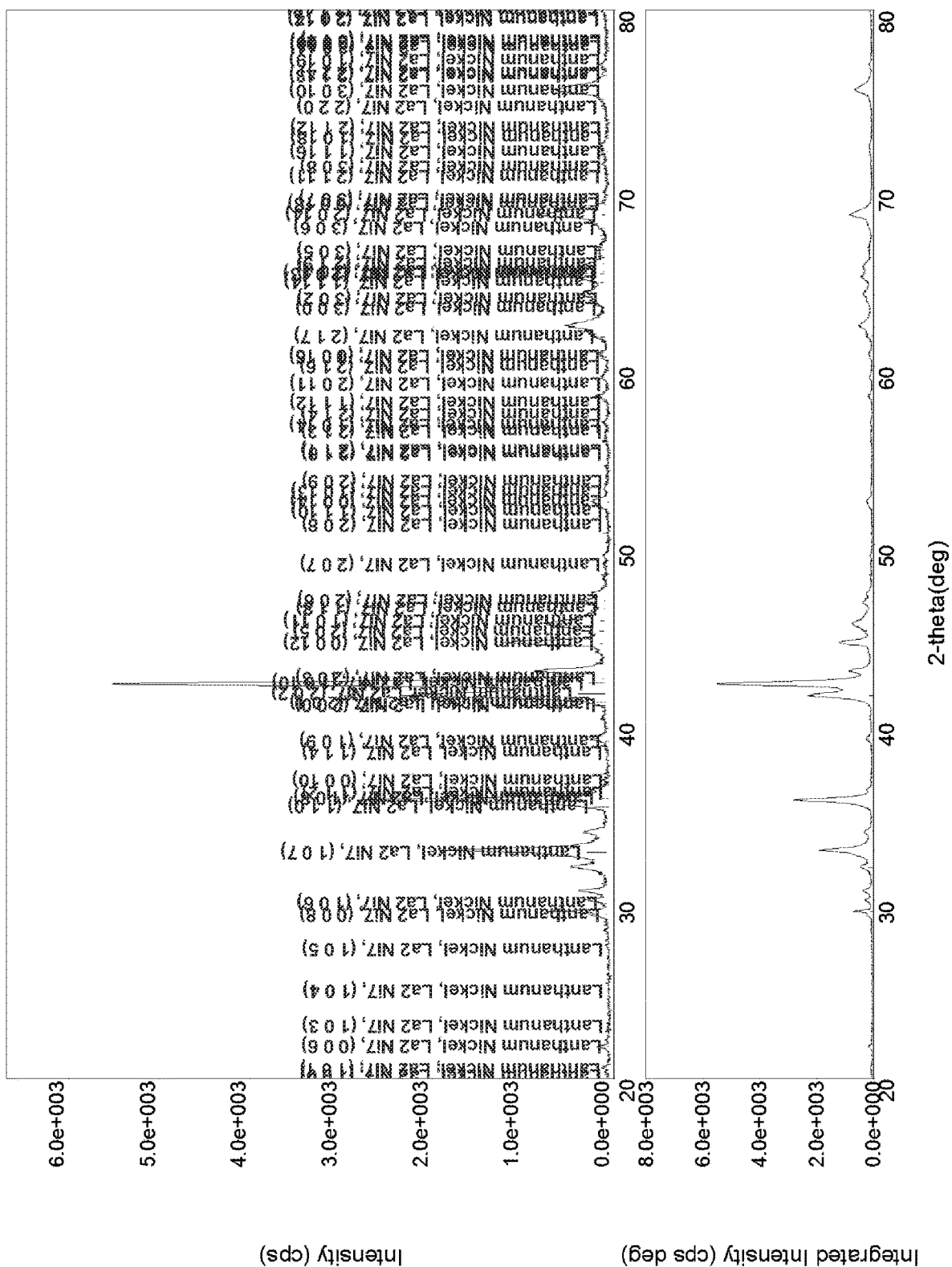
Figures 2, 4:
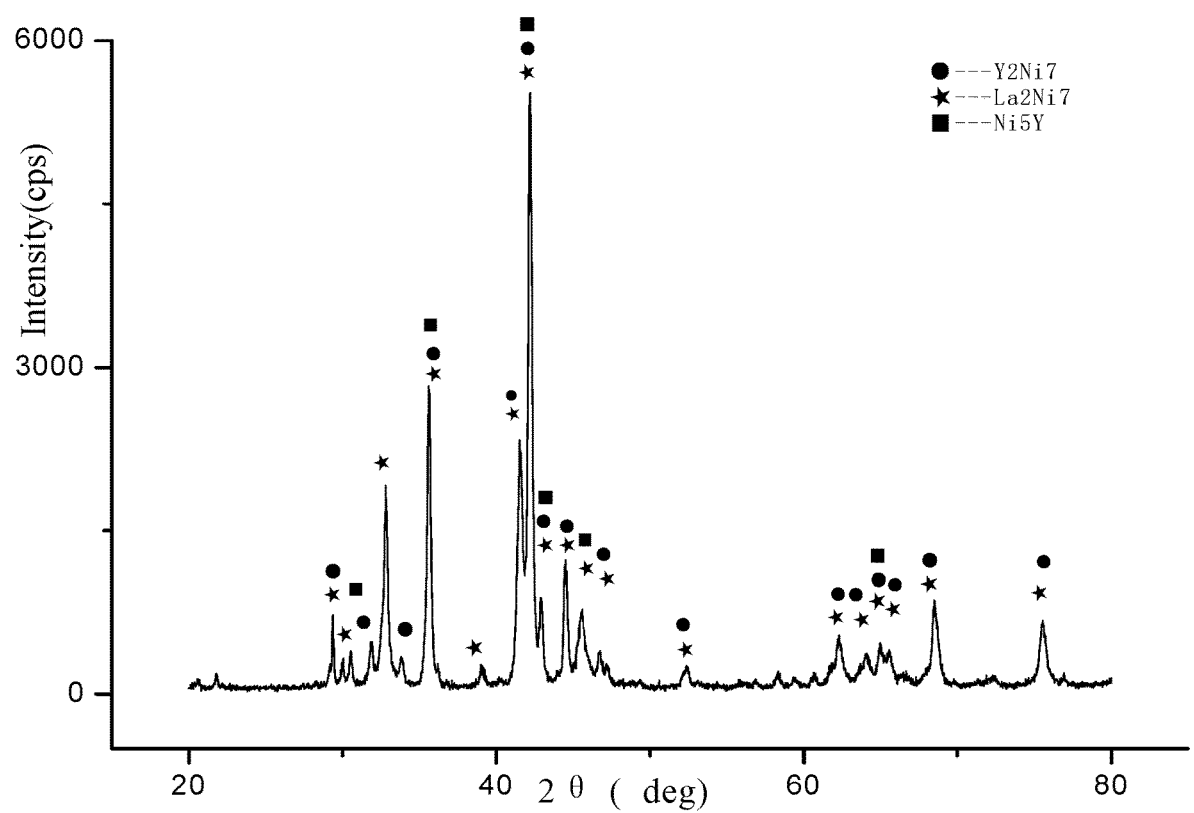
Figures 3, 4:
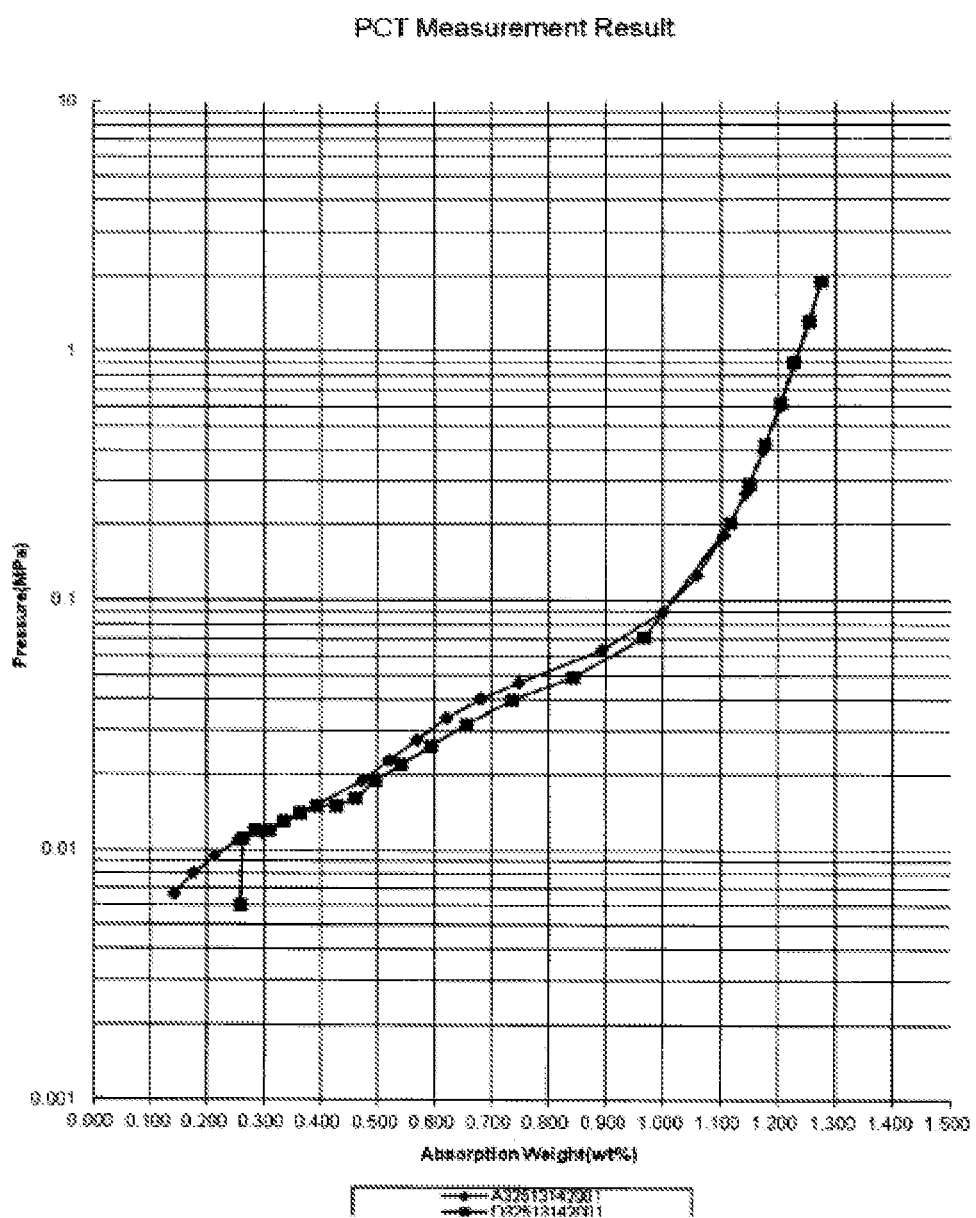

The microstructure of the $La_{1.2}Y_{1.8}Ni_{9.2}Mn_{0.5}Al_{0.3}Co_{0.5}$ alloy (Example D28) was analyzed by an X-ray diffractometer. FIG. 4-1 shows an XRD pattern exported from the X-ray diffractometer. As shown in FIG. 4-1, the alloy may mainly contain $La_2Ni_7$ phase.

FIG. 4-2 shows a redrawn XRD pattern of hydrogen storage alloy $La_{1.2}Y_{1.8}Ni_{9.2}Mn_{0.5}Al_{0.3}Co_{0.5}$ according to the original XRD data of Example D28. As shown in the figure, the alloy contains $Y_2Ni_7$ phase, $La_2Ni_7$ phase or $Ni_5Y$ phase.

FIG. 4-3 is a pressure-composition-temperature curve (P-c-T curve) of $LaY_2Ni_{9.5}Mn_{0.5}Al_{0.3}Cu_{0.2}$ alloy (Example D38) measured at 313K by applying Sievert method. As shown in FIG. 4-3, the maximum hydrogen storage capacity of the alloy could reach 1.28 wt % and the hydrogen desorption plateau pressure is about 0.03 MPa. The

TABLE 4

$RE_xY_yNi_{z-a-b-c}Mn_aAl_bM_c$ hydrogen storage alloy and their electrochemical performance

| Example | hydrogen storage alloy | N | $C_{max}$ (mAh·g$^{-1}$) | $S_{100}$ (%) | $HRD_{350}$ (%) | $LTD_{243}$ (%) | $SD_{72}$ |
|---|---|---|---|---|---|---|---|
| D1 | $LaY_2Ni_{6.5}MnAl_{0.5}Cu$ | 3 | 352 | 95 | 93 | 81 | 83 |
| D2 | $LaY_2Ni_{6.5}MnAl_{0.5}Fe$ | 2 | 346 | 94 | 93 | 82 | 81 |
| D3 | $LaY_2Ni_{6.5}MnAl_{0.5}Co$ | 2 | 368 | 92 | 90 | 81 | 83 |
| D4 | $LaY_2Ni_{6.5}MnAl_{0.5}Sn$ | 2 | 356 | 93 | 92 | 80 | 80 |
| D5 | $LaY_2Ni_{6.5}MnAl_{0.5}(VFe)$ | 1 | 347 | 95 | 87 | 82 | 81 |
| D6 | $LaY_2Ni_{6.5}MnAl_{0.5}W$ | 3 | 352 | 93 | 90 | 78 | 80 |
| D7 | $LaY_2Ni_8MnAl_{0.5}Cu$ | 3 | 371 | 90 | 88 | 81 | 80 |
| D8 | $LaY_2Ni_8MnAl_{0.5}Cu$ | 2 | 376 | 92 | 91 | 83 | 82 |
| D9 | $La_{0.5}Y_{2.5}Ni_8MnAl_{0.5}Cu$ | 3 | 362 | 96 | 93 | 84 | 80 |
| D10 | $La_2YNi_8MnAl_{0.5}Cu$ | 2 | 367 | 90 | 87 | 80 | 82 |
| D11 | $La_{2.5}Y_{0.5}Ni_8MnAl_{0.5}Cu$ | 1 | 360 | 87 | 85 | 77 | 83 |
| D12 | $LaY_2Ni_8MnAlCu$ | 3 | 355 | 95 | 83 | 82 | 85 |
| D13 | $LaY_2Ni_8MnAlCu_{0.1}$ | 3 | 361 | 92 | 82 | 79 | 87 |
| D14 | $LaY_2Ni_8MnAl_{0.5}Fe$ | 2 | 363 | 93 | 90 | 81 | 81 |
| D15 | $LaY_2Ni_8MnAl_{0.5}Co$ | 2 | 378 | 90 | 92 | 83 | 82 |
| D16 | $LaY_2Ni_8MnAl_{0.5}Sn$ | 2 | 362 | 95 | 92 | 82 | 79 |
| D17 | $LaY_2Ni_8MnAl_{0.5}(VFe)$ | 1 | 357 | 93 | 90 | 82 | 81 |
| D18 | $LaY_2Ni_8MnAl_{0.5}W$ | 3 | 352 | 97 | 91 | 83 | 80 |
| D19 | $LaY_2Ni_{9.9}MnAl_{0.5}Cu$ | 3 | 365 | 91 | 90 | 81 | 82 |
| D20 | $LaY_2Ni_{9.9}MnAl_{0.5}Fe$ | 2 | 353 | 94 | 91 | 80 | 79 |
| D21 | $LaY_2Ni_{9.9}MnAl_{0.5}Co$ | 2 | 369 | 95 | 90 | 81 | 80 |
| D22 | $LaY_2Ni_{9.9}MnAl_{0.5}Sn$ | 2 | 356 | 96 | 92 | 78 | 82 |
| D23 | $LaY_2Ni_{9.9}MnAl_{0.5}(VFe)$ | 1 | 347 | 93 | 90 | 82 | 81 |
| D24 | $LaY_2Ni_{9.9}MnAl_{0.5}W$ | 3 | 342 | 98 | 91 | 84 | 83 |
| D25 | $LaY_2Ni_9MnAl_{0.5}CoCu$ | 3 | 352 | 95 | 93 | 85 | 83 |
| D26 | $LaY_2Ni_5MnAl_{0.5}CuSn$ | 2 | 349 | 96 | 91 | 82 | 81 |
| D27 | $LaY_2Ni_8MnAl_{0.5}CoCuSn_{0.5}$ | 2 | 354 | 95 | 90 | 78 | 80 |
| D28 | $La_{1.2}Y_{1.8}Ni_{9.2}Mn_{0.5}Al_{0.3}Co_{0.5}$ | 2 | 372 | 90 | 89 | 81 | 79 |
| D29 | $La_{1.2}Y_{1.8}Ni_{9.2}Mn_{0.5}Al_{0.3}Co_{0.5}$ | 3 | 377 | 92 | 91 | 84 | 82 |
| D30 | $LaY_2Ni_{8.9}MnAl_{0.5}(VFe)$ | 1 | 352 | 93 | 91 | 82 | 81 |
| D31 | $LaY_2Ni_{8.9}MnAl_{0.5}W$ | 3 | 339 | 98 | 91 | 85 | 83 |
| D32 | $LaY_{1.5}Ce_{0.5}Ni_8MnAl_{0.5}Cu$ | 3 | 363 | 92 | 89 | 83 | 82 |
| D33 | $LaY_{1.5}Sm_{0.5}Ni_8MnAl_{0.5}Co$ | 3 | 353 | 95 | 90 | 85 | 83 |
| D34 | $La_{0.8}Ce_{0.2}Y_2Ni_8MnAl_{0.5}Fe$ | 3 | 356 | 93 | 90 | 82 | 80 |
| D35 | $La_{0.8}Ce_{0.2}Y_{1.5}Sm_{0.5}Ni_8MnAl_{0.5}Sn$ | 3 | 334 | 97 | 90 | 85 | 83 |
| D36 | $La_{0.8}Ce_{0.2}Y_{1.5}Nd_{0.5}Ni_8MnAl_{0.5}Sn$ | 3 | 331 | 97 | 91 | 84 | 84 |
| D37 | $MlY_2Ni_{7.7}MnAl_{0.3}CoCu_{0.5}$ | 3 | 355 | 92 | 90 | 83 | 82 |
| D38 | $LaY_2Ni_{9.5}Mn_{0.5}Al_{0.3}Cu_{0.2}$ | 2 | 363 | 92 | 88 | 81 | 80 |

According to Table 4, compared with the alloys of Example D7 and D28 respectively, the alloy electrodes of Example D8 and D29, which have been subjected to anneal- A32513142001 curve in denotes the hydrogen absorption curve of the alloy and D32513142001 curve denotes the hydrogen desorption curve of the alloy.

Example E1~E34

The $RE_xY_yNi_{z-a-b-c}Mn_aAl_bM_cZr_ATi_B$ hydrogen storage alloy of Example E1~E34 were prepared by adopting the high-temperature smelting rapidly quenching method.

The alloy of Example E14 and Example E15 were prepared from the same raw materials. The alloy of Example E14 was prepared by applying the abovementioned high-temperature smelting rapidly quenching method. Specifically, the method including the following steps: providing components satisfying the stoichiometric ratio of the chemical formula by weighing each raw material accurately (the raw materials with high burning loss were increased by appropriate amount), the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert gas Ar to a pressure of 0.055 MPa; smelting the raw materials, keeping the temperature of the smelted raw materials for about 6 minutes and then performing rapidly quenching. The linear speed of the copper roller used for rapidly quenching was 3.4 m/s. The copper roller was cooled with cooling water having a temperature of 25° C.

The alloy of Example E15 was prepared by applying the abovementioned high-temperature smelting rapidly quenching method. Additionally, an annealing heat treatment step was added in the preparing process. Specifically, the method including the following steps: providing components satisfying the stoichiometric ratio of the chemical formula by weighing each raw material accurately (the raw materials with high burning loss were increased by appropriate amount), wherein the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert gas Ar to a pressure of 0.055 MPa; smelting the raw materials, keeping the temperature of the smelted raw materials for about 6 minutes and then performing rapidly quenching. The linear speed of the copper roller used for rapidly quenching was 3.4 m/s. The copper roller was cooled with cooling water having a temperature of 25° C. The rapidly solidified alloy sheet was further annealed at 750° C. for 8 h under vacuum or inert gas atmosphere.

The Ml in Example E28 denotes Lanthanum-rich mischmetal, La accounted for about 64%, Ce accounted for about 25%, Pr accounted for about 3% and Nd accounted for about 8%.

The method for preparing the test electrode was same as that of Example A1~A23.

The method for testing electrochemical performance was same as that of Example A1~A23.

The $RE_xY_yNi_{z-a-b-c}Mn_aAl_bM_cZr_ATi_B$ hydrogen storage alloys of Example E1~E34 and their electrochemical performance are listed in the following table.

TABLE 5

$RE_xY_yNi_{z-a-b-c}Mn_aAl_bM_cZr_ATi_B$ hydrogen storage alloy and their electrochemical performance

| Example | hydrogen storage alloy | N | $C_{max}$ mAh·g$^{-1}$ | $S_{100}$ (%) | $HRD_{350}$ (%) | $LTD_{243}$ (%) | $SD_{72}$ |
|---|---|---|---|---|---|---|---|
| E1 | $LaY_2Ni_{8.7}Mn_{0.5}Al_{0.3}Zr_{0.5}Ti_{0.3}$ | 3 | 386 | 96 | 92 | 79 | 82 |
| E2 | $LaY_2Ni_{9.7}Mn_{0.5}Al_{0.3}Zr_{0.5}Ti_{0.3}$ | 2 | 389 | 94 | 92 | 82 | 83 |
| E3 | $LaY_2Ni_{10}Mn_{0.5}Al_{0.3}Zr_{0.3}Ti_{0.2}$ | 2 | 382 | 93 | 91 | 80 | 81 |
| E4 | $LaY_2Ni_{10}Mn_{0.5}Zr_{0.5}Ti_{0.3}$ | 2 | 387 | 91 | 90 | 82 | 79 |
| E5 | $La_{0.5}Y_{2.5}Ni_{10}Mn_{0.5}Zr_{0.5}Ti_{0.3}$ | 3 | 373 | 95 | 93 | 84 | 82 |
| E6 | $La_2YNi_{10}Mn_{0.5}Zr_{0.5}Ti_{0.3}$ | 2 | 379 | 92 | 91 | 81 | 80 |
| E7 | $La_{2.5}Y_{0.5}Ni_{10}Mn_{0.5}Zr_{0.5}Ti_{0.3}$ | 1 | 381 | 89 | 87 | 78 | 81 |
| E8 | $LaY_2Ni_{9.5}MnZr_{0.5}Ti_{0.3}$ | 1 | 373 | 92 | 90 | 83 | 81 |
| E9 | $LaY_2Ni_9Mn_{1.5}Zr_{0.5}Ti_{0.3}$ | 2 | 365 | 91 | 87 | 79 | 83 |
| E10 | $LaY_2Ni_{8.5}Mn_2Zr_{0.5}Ti_{0.3}$ | 3 | 359 | 89 | 85 | 75 | 84 |
| E11 | $LaY_2Ni_{10}Al_{0.5}Zr_{0.5}Ti_{0.3}$ | 3 | 352 | 96 | 90 | 79 | 82 |
| E12 | $LaY_2Ni_{9.2}MnAl_{0.3}Zr_{0.5}Ti_{0.3}$ | 1 | 360 | 92 | 89 | 81 | 80 |
| E13 | $LaY_2Ni_9MnAl_{0.5}Zr_{0.5}Ti_{0.3}$ | 2 | 354 | 94 | 89 | 82 | 83 |
| E14 | $LaY_2Ni_{9.5}Mn_{0.5}Al_{0.5}Zr_{0.5}Ti_{0.3}$ | 2 | 367 | 92 | 90 | 79 | 80 |
| E15 | $LaY_2Ni_{9.5}Mn_{0.5}Al_{0.5}Zr_{0.5}Ti_{0.3}$ | 3 | 375 | 93 | 92 | 83 | 83 |
| E16 | $LaY_2Ni_9Mn_{0.5}AlZr_{0.5}Ti_{0.3}$ | 3 | 366 | 97 | 90 | 80 | 85 |
| E17 | $La_{1.2}Y_{1.8}Ni_{9.6}Mn_{0.5}Al_{0.3}Co_{0.1}Zr_{0.1}Ti_{0.1}$ | 2 | 378 | 91 | 93 | 80 | 77 |
| E18 | $La_{1.2}Y_{1.8}Ni_{9.2}Mn_{0.5}Al_{0.3}Co_{0.5}Zr_{0.1}Ti_{0.1}$ | 3 | 371 | 93 | 91 | 79 | 80 |
| E19 | $La_{1.2}Y_{1.8}Ni_{8.7}Mn_{0.5}Al_{0.3}CoZr_{0.1}Ti_{0.1}$ | 3 | 362 | 95 | 88 | 76 | 82 |
| E20 | $La_{1.2}Y_{1.8}Ni_{7.7}Mn_{0.5}Al_{0.3}Co_2Zr_{0.1}Ti_{0.1}$ | 4 | 351 | 98 | 85 | 72 | 85 |
| E21 | $LaY_{1.5}Ce_{0.5}Ni_{9.5}Mn_{0.5}Al_{0.5}Zr_{0.5}$ | 3 | 363 | 95 | 90 | 82 | 85 |
| E22 | $LaY_{1.5}Ce_{0.5}Ni_{9.5}Mn_{0.5}Al_{0.5}Zr$ | 5 | 342 | 98 | 87 | 80 | 86 |
| E23 | $LaY_{1.5}Sm_{0.5}Ni_{9.5}Mn_{0.5}Al_{0.5}Ti_{0.5}$ | 3 | 349 | 93 | 91 | 80 | 82 |
| E24 | $LaY_{1.5}Sm_{0.5}Ni_{9.5}Mn_{0.5}Al_{0.5}Ti$ | 4 | 337 | 97 | 89 | 81 | 85 |
| E25 | $La_{0.8}Ce_{0.2}Y_2Ni_{9.5}Mn_{0.5}Al_{0.5}Zr_{0.3}Ti_{0.2}$ | 3 | 370 | 95 | 91 | 82 | 81 |
| E26 | $La_{0.8}Ce_{0.2}Y_{1.5}Sm_{0.5}Ni_{9.5}Mn_{0.5}Al_{0.5}Zr_{0.2}$ | 3 | 362 | 95 | 88 | 78 | 79 |
| E27 | $La_{0.8}Ce_{0.2}Y_{1.5}Nd_{0.5}Ni_{9.5}Mn_{0.5}Al_{0.5}Zr_{0.2}$ | 3 | 359 | 96 | 90 | 80 | 81 |
| E28 | $MlY_2Ni_{9.5}Mn_{0.5}Al_{0.5}Ti_{0.2}$ | 3 | 357 | 93 | 91 | 80 | 81 |
| E29 | $LaY_2Ni_{9.3}Mn_{0.5}Al_{0.2}Cu_{0.5}Zr_{0.3}Ti_{0.2}$ | 3 | 374 | 92 | 92 | 81 | 82 |
| E30 | $LaY_2Ni_{9.3}Mn_{0.5}Al_{0.2}Fe_{0.5}Zr_{0.5}$ | 2 | 369 | 95 | 91 | 83 | 82 |
| E31 | $LaY_2Ni_{9.3}Mn_{0.5}Al_{0.2}Co_{0.5}Zr_{0.3}Ti_{0.2}$ | 2 | 387 | 93 | 90 | 83 | 81 |
| E32 | $LaY_2Ni_{9.3}Mn_{0.5}Al_{0.2}Sn_{0.5}Ti_{0.3}$ | 2 | 366 | 93 | 92 | 82 | 80 |
| E33 | $LaY_2Ni_{9.3}Mn_{0.5}Al_{0.2}(VFe)_{0.5}Zr_{0.3}$ | 2 | 361 | 95 | 91 | 80 | 81 |
| E34 | $LaY_2Ni_{9.3}Mn_{0.5}Al_{0.2}W_{0.5}Zr_{0.3}$ | 3 | 355 | 96 | 90 | 82 | 80 |

According to Table 5, compared with the $LaY_2Ni_{9.5}Mn_{0.5}Al_{0.5}Zr_{0.5}Ti_{0.3}$ alloy of Example E14, the alloy electrode of Example E15, which has been subjected to annealing heat treatment, has increased electrochemical capacity, and improved cycle life, discharge capacity, low temperature discharge characteristic, as well as self-discharge performance.

Figures 1, 5:
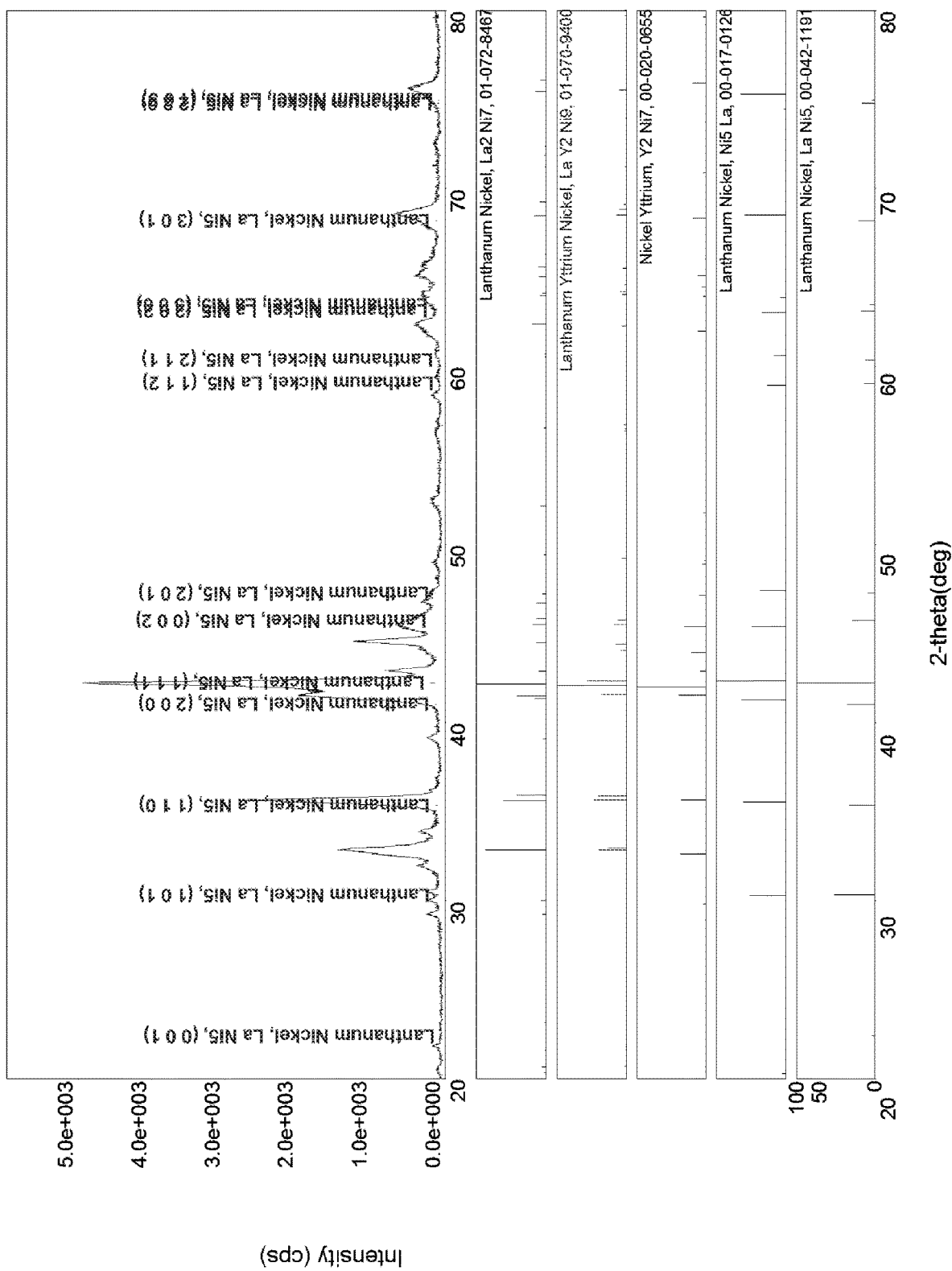
Figures 2, 5:
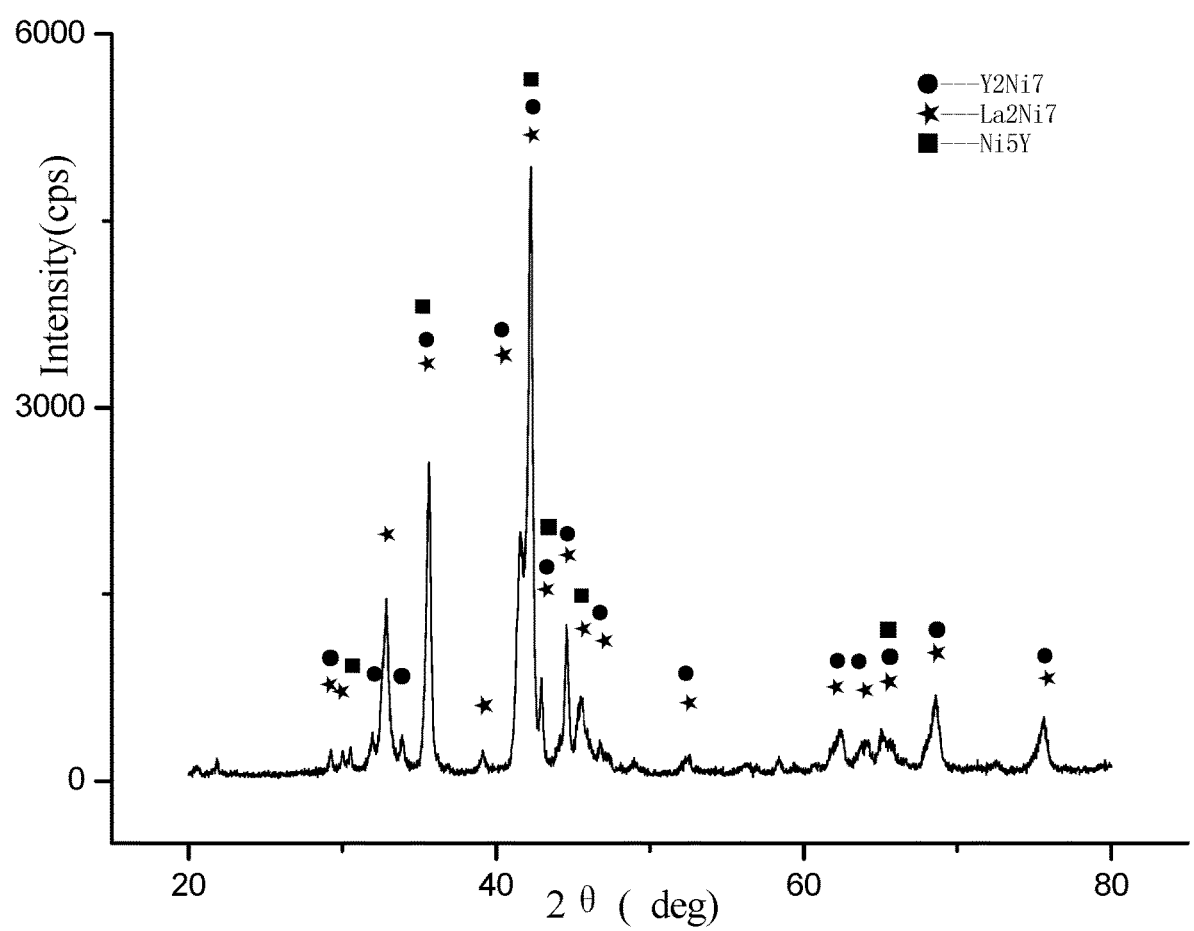

The microstructure of the $La_{1.2}Y_{1.8}Ni_{9.2}Mn_{0.5}Al_{0.3}Co_{0.5}Zr_{0.1}Ti_{0.1}$ alloy (Example E18) was analyzed by an X-ray diffractometer. FIG. 5-1 shows an XRD pattern exported from the X-ray diffractometer. As shown in FIG. 5-1, the alloy may contain $La_2Ni_7$ phase, $LaY_2Ni_9$ phase, $Y_2Ni_7$ phase, $Ni_5La$ phase or $LaNi_5$ phase, etc. The alloy may also contain $Ce_2Ni_7$ or $Y_2Ni_7$ phase.

FIG. 5-2 shows a redrawn XRD pattern of hydrogen storage alloy according to the original XRD data of Example E18. As shown in the figure, the alloy contains $Y_2Ni_7$, $La_2Ni_7$, $Ni_5Y$ phase.

Example F1~F35

The $RE_xY_yNi_{z-a-b-c}Mn_aAl_bM_cZr_ATi_B$ hydrogen storage alloy of Example F1~B35 were prepared by adopting the high-temperature smelting rapidly quenching method.

The alloy of Example F12 and Example F13 were prepared from the same raw materials. The alloy of Example F12 was prepared by applying the abovementioned high-temperature smelting rapidly quenching method. Specifically, the method including the following steps: providing components satisfying the stoichiometric ratio of the chemical formula by weighing each raw material accurately (the raw materials with high burning loss were increased by appropriate amount) wherein the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert gas Ar to a pressure of 0.055 MPa; smelting the raw materials, keeping the temperature of the smelted raw materials for about 6 minutes and then performing rapidly quenching. The linear speed of the copper roller used for rapidly quenching was 3.4 m/s. The copper roller was cooled with cooling water having a temperature of 25° C.

The alloy of Example F13 was prepared by applying the abovementioned high-temperature smelting rapidly quenching method. Additionally, an annealing heat treatment step was added in the preparing process. Specifically, the method including the following steps: providing components satisfying the stoichiometric ratio of the chemical formula by weighing each raw material accurately (the raw materials with high burning loss were increased by appropriate amount), wherein the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert gas Ar to a pressure of 0.055 MPa; smelting the raw materials, keeping the temperature of the smelted raw materials for about 6 minutes and then performing rapidly quenching. The linear speed of the copper roller used for rapidly quenching was 3.4 m/s. The copper roller was cooled with cooling water having a temperature of 25° C. The rapidly solidified alloy sheet was further annealed at 750° C. for 8 h under vacuum or inert gas atmosphere.

The Ml in Example F24 denotes Lanthanum-rich mischmetal, La accounted for about 64%, Ce accounted for about 25%, Pr accounted for about 3% and Nd accounted for about 8%.

The method for preparing the test electrode was same as that of Example A1~A23.

The method for testing electrochemical performance was same as that of Example A1~A23.

The $RE_xY_yNi_{z-a-b-c}Mn_aAl_bM_cZr_ATi_B$ hydrogen storage alloys of Example F1~F35 and their electrochemical performance are listed in the following table 6.

TABLE 6

$RE_xY_yNi_{z-a-b-c}Mn_aAl_bM_cZr_ATi_B$ hydrogen storage alloy and their electrochemical performance

| | | | | electrochemical performances | | | | |
|---|---|---|---|---|---|---|---|---|
| Example | hydrogen storage alloy | N | $C_{max}$ mAh·g$^{-1}$ | $S_{100}$ (%) | $HRD_{350}$ (%) | $LTD_{243}$ (%) | $SD_{72}$ | |
| F1 | $LaY_2Ni_{10.2}Mn_{0.5}Al_{0.3}Zr_{0.5}Ti_{0.3}$ | 3 | 377 | 95 | 92 | 83 | 80 | |
| F2 | $LaY_2Ni_{10.6}Mn_{0.5}Al_{0.3}Zr_{0.5}Ti_{0.3}$ | 2 | 387 | 93 | 90 | 82 | 81 | |
| F3 | $LaY_2Ni_{11.7}Mn_{0.5}Al_{0.3}Zi_{0.3}Ti_{0.2}$ | 2 | 371 | 95 | 91 | 80 | 85 | |
| F4 | $LaY_2Ni_{10.6}Mn_{0.8}Zr_{0.5}Ti_{0.3}$ | 2 | 380 | 94 | 92 | 82 | 82 | |
| F5 | $La_{0.5}Y_{2.5}Ni_{10.6}Mn_{0.8}Zr_{0.5}Ti_{0.3}$ | 3 | 374 | 96 | 93 | 85 | 77 | |
| F6 | $La_2YNi_{10.6}Mn_{0.8}Zr_{0.5}Ti_{0.3}$ | 2 | 383 | 89 | 90 | 81 | 83 | |
| F7 | $La_{2.5}Y_{0.5}Ni_{10.6}Mn_{0.8}Zr_{0.5}Ti_{0.3}$ | 1 | 377 | 88 | 87 | 78 | 85 | |
| F8 | $LaY_2Ni_{9.9}Mn_{1.5}Zr_{0.5}Ti_{0.3}$ | 1 | 375 | 93 | 91 | 85 | 82 | |
| F9 | $LaY_2Ni_{10.6}Al_{0.8}Zr_{0.5}Ti_{0.3}$ | 3 | 353 | 98 | 92 | 85 | 83 | |
| F10 | $LaY_2Ni_{9.4}Mn_{1.5}Al_{0.5}Zr_{0.5}Ti_{0.3}$ | 1 | 369 | 95 | 91 | 83 | 83 | |
| F11 | $LaY_2Ni_{10.1}MnAl_{0.3}Zr_{0.5}Ti_{0.3}$ | 2 | 388 | 93 | 89 | 85 | 82 | |
| F12 | $LaY_2Ni_{9.9}MnAl_{0.5}Zr_{0.5}Ti_{0.3}$ | 2 | 385 | 92 | 91 | 83 | 82 | |
| F13 | $LaY_2Ni_{9.9}MnAl_{0.5}Zr_{0.5}Ti_{0.3}$ | 3 | 387 | 93 | 93 | 85 | 83 | |
| F14 | $LaY_2Ni_{8.9}Mn_2Al_{0.5}Zr_{0.5}Ti_{0.3}$ | 2 | 375 | 92 | 90 | 82 | 85 | |
| F15 | $LaY_2Ni_{8.4}Mn_{2.5}Al_{0.5}Zr_{0.5}Ti_{0.3}$ | 2 | 371 | 91 | 88 | 81 | 86 | |
| F16 | $LaY_2Ni_{9.9}MnAl_{0.5}ZrTi_{0.3}$ | 4 | 357 | 98 | 92 | 86 | 87 | |
| F17 | $LaY_{1.5}Ce_{0.5}Ni_{9.9}MnAl_{0.5}Zr_{0.5}$ | 3 | 380 | 95 | 90 | 83 | 82 | |
| F18 | $LaY_{1.5}Sm_{0.5}Ni_{9.9}MnAl_{0.5}Zr_{0.5}$ | 3 | 365 | 94 | 90 | 82 | 81 | |
| F19 | $LaY_{1.5}Sm_{0.5}Ni_{9.9}MnAl_{0.5}Ti$ | 4 | 357 | 96 | 91 | 83 | 79 | |
| F20 | $La_{0.8}Ce_{0.2}Y_2Ni_{9.9}MnAl_{0.5}Zr_{0.3}Ti_{0.2}$ | 3 | 378 | 92 | 90 | 85 | 83 | |
| F21 | $La_{0.8}Ce_{0.2}Y_2Ni_{9.4}MnAlZr_{0.3}Ti_{0.2}$ | 4 | 361 | 97 | 83 | 80 | 85 | |
| F22 | $La_{0.8}Ce_{0.2}Y_{1.5}Sm_{0.5}Ni_{9.9}MnAl_{0.5}Zr_{0.2}$ | 3 | 357 | 96 | 89 | 84 | 80 | |
| F23 | $La_{0.8}Ce_{0.2}Y_{1.5}Nd_{0.5}Ni_{9.9}MnAl_{0.5}Zr_{0.2}$ | 3 | 358 | 96 | 90 | 85 | 82 | |

TABLE 6-continued $RE_xY_yNi_{z-a-b-c}Mn_aAl_bM_cZr_ATi_B$ hydrogen storage alloy and their electrochemical performance

| Example | hydrogen storage alloy | N | $C_{max}$ mAh·g$^{-1}$ | $S_{100}$ (%) | $HRD_{350}$ (%) | $LTD_{243}$ (%) | $SD_{72}$ |
|---|---|---|---|---|---|---|---|
| F24 | $MlY_2Ni_{9.9}MnAl_{0.5}Ti_{0.2}$ | 3 | 363 | 96 | 91 | 82 | 82 |
| F25 | $LaY_2Ni_{10.2}Mn_{0.5}Al_{0.2}Cu_{0.5}Zr_{0.3}Ti_{0.2}$ | 3 | 370 | 93 | 90 | 82 | 80 |
| F26 | $LaY_2Ni_{10.2}Mn_{0.5}Al_{0.2}Fe_{0.5}Zr_{0.5}$ | 2 | 358 | 96 | 90 | 83 | 81 |
| F27 | $LaY_2Ni_{10.6}Mn_{0.5}Al_{0.2}Co_{0.1}Zr_{0.3}Ti_{0.2}$ | 1 | 377 | 92 | 93 | 84 | 78 |
| F28 | $LaY_2Ni_{10.2}Mn_{0.5}Al_{0.2}Co_{0.5}Zr_{0.3}Ti_{0.2}$ | 2 | 374 | 95 | 91 | 82 | 80 |
| F29 | $LaY_2Ni_{9.7}Mn_{0.5}Al_{0.2}CoZr_{0.3}Ti_{0.2}$ | 3 | 362 | 96 | 88 | 79 | 82 |
| F30 | $LaY_2Ni_{8.7}Mn_{0.5}Al_{0.2}Co_2Zr_{0.3}Ti_{0.2}$ | 4 | 351 | 97 | 85 | 75 | 83 |
| F31 | $LaY_2Ni_{8.2}Mn_{0.5}Al_{0.2}Co_{2.5}Zr_{0.3}Ti_{0.2}$ | 4 | 342 | 98 | 81 | 71 | 85 |
| F32 | $LaY_2Ni_{10.2}Mn_{0.5}Al_{0.2}Sn_{0.5}Ti_{0.3}$ | 2 | 361 | 95 | 90 | 81 | 79 |
| F33 | $LaY_2Ni_{10.2}Mn_{0.5}Al_{0.2}(VFe)_{0.5}Zr_{0.3}$ | 1 | 356 | 95 | 91 | 83 | 82 |
| F34 | $LaY_2Ni_{10.2}Mn_{0.5}Al_{0.2}W_{0.5}Zr_{0.3}$ | 3 | 350 | 98 | 92 | 84 | 83 |
| F35 | $LaY_2Ni_{10.6}Mn_{0.5}Al_{0.3}Zr_{0.1}$ | 1 | 377 | 93 | 93 | 85 | 83 |

According to Table 6, compared with the $LaY_2Ni_{9.9}MnAl_{0.5}Zr_{0.5}Ti_{0.3}$ alloy of Example F12, the alloy electrode of Example F13, which has been subjected to annealing heat treatment, has increased electrochemical capacity, and improved cycle life, discharge capacity, low temperature discharge characteristic, as well as self-discharge performance.

Figures 1, 6:
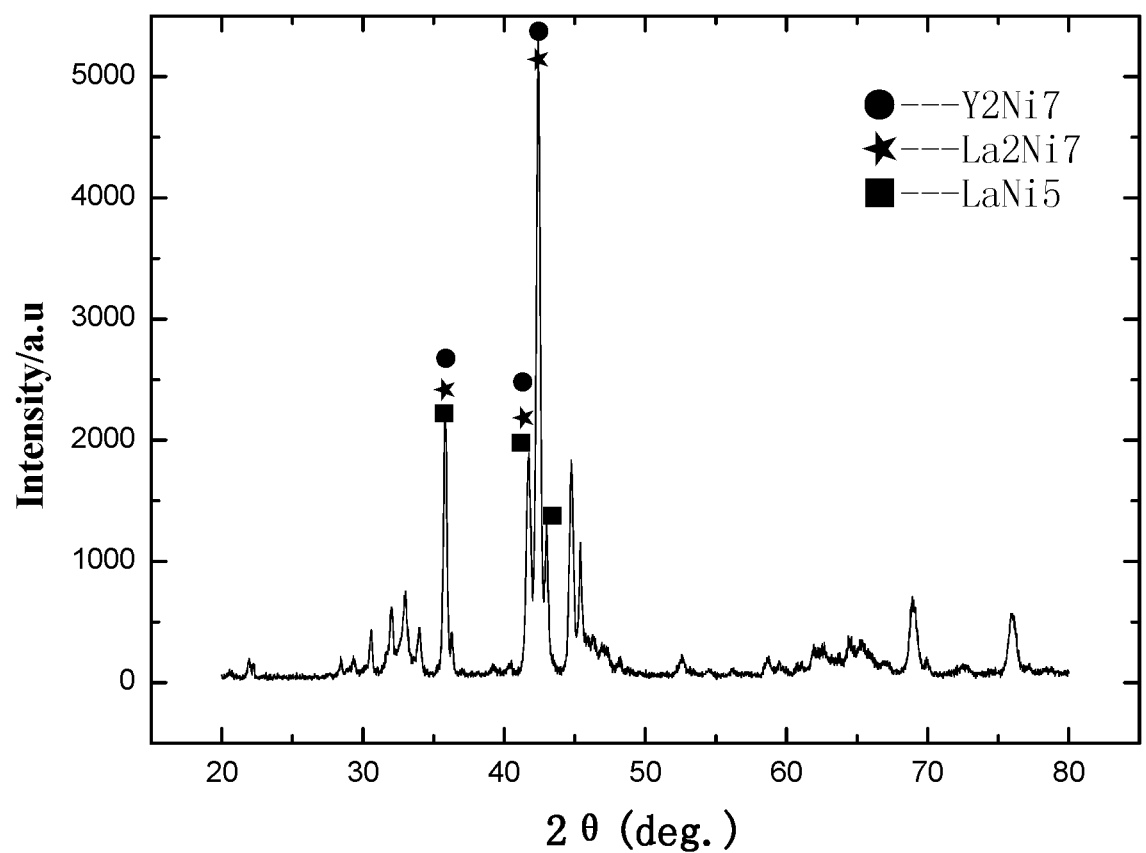

The microstructure of the $LaY_2Ni_{10.6}Mn_{0.5}Al_{0.3}Zr_{0.1}$ alloy (Example F35) was analyzed by an X-ray diffractometer. FIG. 6-1 shows an XRD pattern exported from the X-ray diffractometer. As shown in FIG. 6-1, the alloy may contain $Y_2Ni_7$ phase, $La_2Ni_7$ phase, $Pr_5Co_{19}$ phase, $Ce_5Co_{19}$ phase or $LaNi_5$ phase.

Example G1~G34

The $RE_xY_yNi_{z-a-b-c}Mn_aAl_bM_cZr_ATi_B$ hydrogen storage alloy of Example G1~G34 were prepared by adopting the high-temperature smelting rapidly quenching method.

The alloy of Example G15 and Example G16 were prepared from the same raw materials. The alloy of Example G15 was prepared by applying the abovementioned high-temperature smelting rapidly quenching method. Specifically, the method including the following steps: providing components satisfying the stoichiometric ratio of the chemical formula by weighing each raw material accurately (the raw materials with high burning loss were increased by appropriate amount), wherein the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert gas Ar to a pressure of 0.055 MPa; smelting the raw materials, keeping the temperature of the smelted raw materials for about 6 minutes and then performing rapidly quenching. The linear speed of the copper roller used for rapidly quenching was 3.4 m/s. The copper roller was cooled with cooling water having a temperature of 25° C.

The alloy of Example G16 was prepared by applying the abovementioned high-temperature smelting rapidly quenching method. Additionally, an annealing heat treatment step was added in the preparing process. Specifically, the method including the following steps: providing components satisfying the stoichiometric ratio of the chemical formula by weighing each raw material accurately (the raw materials with high burning loss were increased by appropriate amount) wherein the purity of each elemental metal or intermediate alloy used as raw material is greater than 99.0%; putting the raw materials into an $Al_2O_3$ crucible in sequence, vacuuming the crucible to a pressure of 3.0 Pa, and then filling the crucible with an inert gas Ar to a pressure of 0.055 MPa; smelting the raw materials, keeping the temperature of the smelted raw materials for about 6 minutes and then performing rapidly quenching. The linear speed of the copper roller used for rapidly quenching was 3.4 m/s. The copper roller was cooled with cooling water having a temperature of 25° C. The rapidly solidified alloy sheet was further annealed at 750° C. for 8 h under vacuum or inert gas atmosphere.

The Ml in Example G25 denotes Lanthanum-rich mischmetal, La accounted for about 64%, Ce accounted for about 25%, Pr accounted for about 3% and Nd accounted for about 8%.

The method for preparing the test electrode was same as that of Example A1~A23.

The method for testing electrochemical performance was same as that of Example A1~A23.

The $RE_xY_yNi_{z-a-b-c}Mn_aAl_bM_cZr_ATi_B$ hydrogen storage alloys of Example G1~G34 and their electrochemical performance are listed in the following table.

TABLE 7

$RE_xY_yNi_{z-a-b-c}Mn_aAl_bM_cZr_ATi_B$ hydrogen storage alloy and their electrochemical performance

| Example | hydrogen storage alloy | N | $C_{max}$ mAh·g$^{-1}$ | $S_{100}$ (%) | $HRD_{350}$ (%) | $LTD_{243}$ (%) | $SD_{72}$ |
|---|---|---|---|---|---|---|---|
| G1 | $LaY_2Ni_{7.7}Mn_{0.5}Al_{0.3}Zr_{0.5}Ti_{0.3}$ | 2 | 353 | 96 | 91 | 80 | 80 |
| G2 | $LaY_2Ni_{8.2}Mn_{0.5}Al_{0.3}Zr_{0.5}Ti_{0.3}$ | 2 | 367 | 93 | 90 | 79 | 81 |
| G3 | $LaY_2Ni_{8.5}Mn_{0.5}Al_{0.3}Zr_{0.3}Ti_{0.2}$ | 3 | 375 | 92 | 91 | 77 | 80 |

TABLE 7-continued

RE$_x$Y$_y$Ni$_{z-a-b-c}$Mn$_a$Al$_b$M$_c$Zr$_A$Ti$_B$ hydrogen storage alloy and their electrochemical performance

| Example | hydrogen storage alloy | N | $C_{max}$ mAh·g$^{-1}$ | $S_{100}$ (%) | $HRD_{350}$ (%) | $LTD_{243}$ (%) | $SD_{72}$ |
|---|---|---|---|---|---|---|---|
| G4 | La$_{0.5}$Y$_{2.5}$Ni$_{8.5}$Mn$_{0.5}$Al$_{0.3}$Zr$_{0.3}$Ti$_{0.2}$ | 4 | 351 | 97 | 94 | 81 | 76 |
| G5 | La$_2$YNi$_{8.5}$Mn$_{0.5}$Al$_{0.3}$Zr$_{0.3}$Ti$_{0.2}$ | 2 | 363 | 93 | 89 | 75 | 79 |
| G6 | LaY$_2$Ni$_{8.9}$Mn$_{0.5}$Zr$_{0.1}$Ti$_{0.3}$ | 1 | 374 | 90 | 92 | 81 | 77 |
| G7 | LaY$_2$Ni$_{8.5}$Mn$_{0.5}$Zr$_{0.5}$Ti$_{0.3}$ | 2 | 372 | 93 | 92 | 78 | 79 |
| G8 | LaY$_2$Ni$_8$Mn$_{0.5}$ZrTi$_{0.3}$ | 3 | 365 | 97 | 87 | 73 | 81 |
| G9 | LaY$_2$Ni$_8$MnZr$_{0.5}$Ti$_{0.3}$ | 1 | 363 | 91 | 90 | 77 | 80 |
| G10 | LaY$_2$Ni$_{7.5}$Mn$_{1.5}$Zr$_{0.5}$Ti$_{0.3}$ | 2 | 359 | 90 | 87 | 74 | 83 |
| G11 | LaY$_2$Ni$_7$Mn$_2$Zr$_{0.5}$Ti$_{0.3}$ | 3 | 350 | 93 | 85 | 71 | 85 |
| G12 | LaY$_2$Ni$_{8.5}$Al$_{0.5}$Zr$_{0.5}$Ti$_{0.1}$ | 3 | 343 | 98 | 92 | 80 | 83 |
| G13 | LaY$_2$Ni$_{7.7}$MnAl$_{0.3}$Zr$_{0.5}$Ti$_{0.3}$ | 1 | 352 | 92 | 89 | 78 | 81 |
| G14 | LaY$_2$Ni$_{7.5}$MnAl$_{0.5}$Zr$_{0.5}$Ti$_{0.3}$ | 2 | 340 | 97 | 90 | 81 | 82 |
| G15 | LaY$_2$Ni$_8$Mn$_{0.5}$Al$_{0.5}$Zr$_{0.5}$Ti$_{0.3}$ | 2 | 359 | 91 | 89 | 79 | 82 |
| G16 | LaY$_2$Ni$_8$Mn$_{0.5}$Al$_{0.5}$Zr$_{0.5}$Ti$_{0.3}$ | 3 | 370 | 92 | 91 | 80 | 82 |
| G17 | LaY$_2$Ni$_{7.5}$Mn$_{0.5}$AlZr$_{0.5}$Ti$_{0.3}$ | 4 | 352 | 96 | 88 | 75 | 84 |
| G18 | LaY$_2$Ni$_{8.3}$Mn$_{0.5}$Al$_{0.2}$Zr$_{0.1}$ | 3 | 367 | 93 | 90 | 79 | 80 |
| G19 | LaY$_{1.5}$Ce$_{0.5}$Ni$_8$Mn$_{0.5}$Al$_{0.5}$Zr$_{0.5}$ | 3 | 351 | 94 | 89 | 77 | 80 |
| G20 | LaY$_{1.5}$Sm$_{0.5}$Ni$_8$Mn$_{0.5}$Al$_{0.5}$Ti$_{0.5}$ | 2 | 357 | 93 | 91 | 76 | 83 |
| G21 | LaY$_{1.5}$Sm$_{0.5}$Ni$_8$Mn$_{0.5}$Al$_{0.5}$Ti | 3 | 348 | 96 | 93 | 80 | 82 |
| G22 | La$_{0.8}$Ce$_{0.2}$Y$_2$Ni$_8$Mn$_{0.5}$Al$_{0.5}$Zr$_{0.3}$Ti$_{0.2}$ | 3 | 368 | 92 | 91 | 79 | 80 |
| G23 | La$_{0.8}$Ce$_{0.2}$Y$_{1.5}$Sm$_{0.5}$Ni$_8$Mn$_{0.5}$Al$_{0.5}$Zr$_{0.2}$ | 3 | 355 | 95 | 88 | 80 | 79 |
| G24 | La$_{0.8}$Ce$_{0.2}$Y$_{1.5}$Nd$_{0.5}$Ni$_8$Mn$_{0.5}$Al$_{0.5}$Zr$_{0.2}$ | 3 | 352 | 96 | 90 | 81 | 80 |
| G25 | MlY$_2$Ni$_8$Mn$_{0.5}$Al$_{0.5}$Ti$_{0.2}$ | 3 | 359 | 96 | 91 | 78 | 80 |
| G26 | LaY$_2$Ni$_{7.8}$Mn$_{0.5}$Al$_{0.2}$Cu$_{0.5}$Zr$_{0.3}$Ti$_{0.2}$ | 3 | 363 | 93 | 94 | 82 | 81 |
| G27 | LaY$_2$Ni$_{7.8}$Mn$_{0.5}$Al$_{0.2}$Fe$_{0.5}$Zr$_{0.5}$ | 2 | 352 | 93 | 92 | 83 | 81 |
| G28 | LaY$_2$Ni$_{8.2}$Mn$_{0.5}$Al$_{0.2}$Co$_{0.1}$Zr$_{0.3}$Ti$_{0.2}$ | 2 | 375 | 90 | 89 | 84 | 80 |
| G29 | LaY$_2$Ni$_{7.8}$Mn$_{0.5}$Al$_{0.2}$Co$_{0.5}$Zr$_{0.3}$Ti$_{0.2}$ | 2 | 373 | 93 | 91 | 81 | 82 |
| G30 | LaY$_2$Ni$_{7.3}$Mn$_{0.5}$Al$_{0.2}$CoZr$_{0.3}$Ti$_{0.2}$ | 3 | 361 | 96 | 87 | 77 | 83 |
| G31 | LaY$_2$Ni$_{6.3}$Mn$_{0.5}$Al$_{0.2}$Co$_2$Zr$_{0.3}$Ti$_{0.2}$ | 4 | 348 | 98 | 82 | 73 | 85 |
| G32 | LaY$_2$Ni$_{7.8}$Mn$_{0.5}$Al$_{0.2}$Sn$_{0.5}$Ti$_{0.3}$ | 2 | 359 | 94 | 92 | 80 | 79 |
| G33 | LaY$_2$Ni$_{7.8}$Mn$_{0.5}$Al$_{0.2}$(VFe)$_{0.5}$Zr$_{0.3}$ | 1 | 352 | 96 | 89 | 82 | 80 |
| G34 | LaY$_2$Ni$_{7.8}$Mn$_{0.5}$Al$_{0.2}$W$_{0.5}$Zr$_{0.3}$ | 3 | 355 | 95 | 91 | 82 | 81 |

According to Table 7, compared with the LaY$_2$Ni$_8$Mn$_{0.5}$Al$_{0.5}$Zr$_{0.5}$Ti$_{0.3}$ alloy of Example G15, the alloy electrode alloy of Example G16, which has been subjected to annealing heat treatment, has increased electrochemical capacity, and improved cycle life, discharge capacity, low temperature discharge characteristic, as well as self-discharge performance.

Figures 1, 7:
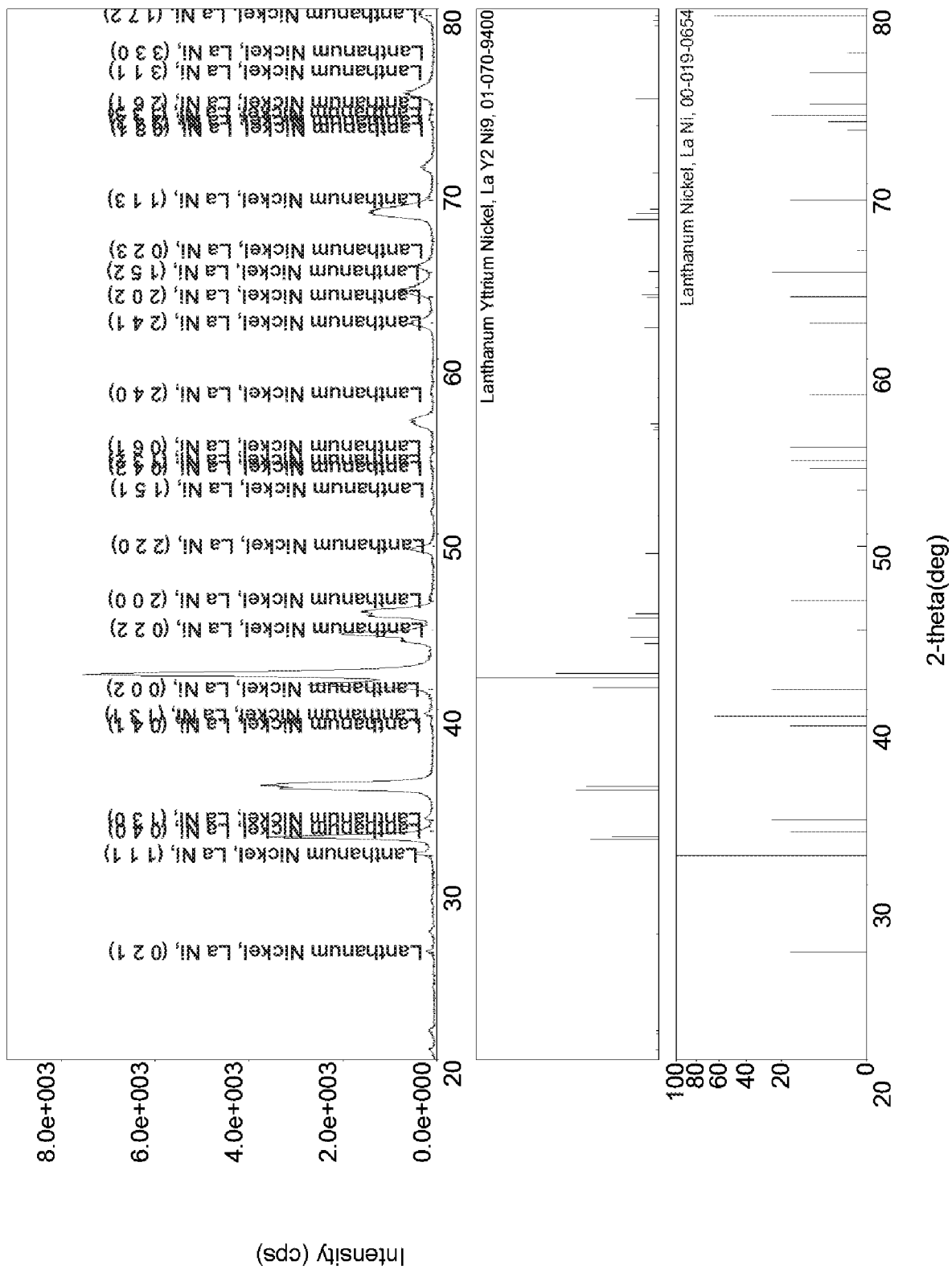
Figures 2, 7:
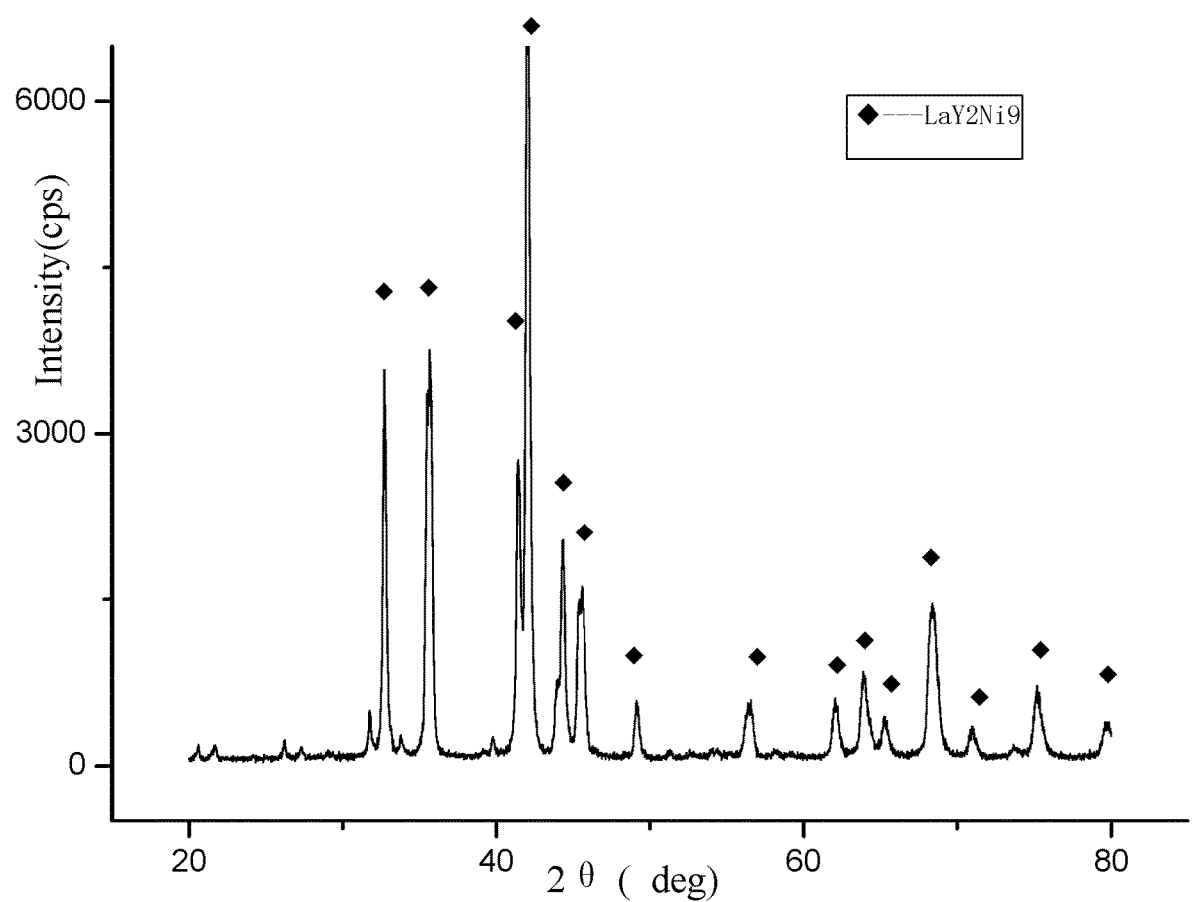

The microstructure of the LaY$_2$Ni$_{8.3}$Mn$_{0.5}$Al$_{0.2}$Zr$_{0.1}$ alloy (Example G18) was analyzed by an X-ray diffractometer. FIG. 7-1 shows an XRD pattern exported from the X-ray diffractometer. As shown in FIG. 7-1, the alloy may contain LaY$_2$Ni$_9$ phase or LaNi phase.

FIG. 7-2 shows a redrawn XRD pattern of hydrogen storage alloy according to the original XRD data of Example G18. As shown in the figure, the alloy contain LaY$_2$Ni$_9$ phase.

Finally, it should be noted that the above embodiments are merely provided for describing the technical solutions of the present invention but not to limit them; although the present invention has been described in detail with reference to the preferred embodiments, it will be understood by those of ordinary skill in the art: the technical features of the present invention may still be modified or equivalent replacements may be made to some technical features; without departing from the spirit of the present invention, which should be covered in the scope of the technical solutions.

The invention claimed is:

1. A rare earth based hydrogen storage alloy represented by the general formula (I):

  (I)

RE$_x$Y$_y$Ni$_{z-a-b-c}$Mn$_a$Al$_b$M$_c$Zr$_A$Ti$_B$ wherein RE denotes one or more element(s) selected from the group consisting of La, Ce, Pr, Nd, Sm, and Gd; M denotes one or more element(s) selected from the group consisting of Cu, Fe, Co, Sn, V, and W; x>0, y≥0.5, and x+y=3; 13≥z≥7; 6≥a+b>0, 5≥c≥0, and 4≥A+B≥0.

2. The rare earth based hydrogen storage alloy according to claim 1, wherein x>0, y≥0.5, x+y=3; 12.5≥z≥8.5; 5.5≥a+b>0, 3.5≥c≥0, and 2.5≥A+B≥0.

3. The rare earth based hydrogen storage alloy according to claim 2, wherein c=0 and A=B=0.

4. The rare earth based hydrogen storage alloy according to claim 3, wherein 12.5≥z≥11.

5. The rare earth based hydrogen storage alloy according to claim 3, wherein 11>z≥9.5; and 4.5≥a+b>0.

6. The rare earth based hydrogen storage alloy according to claim 3, wherein 9.5>z≥8.5; and 3.5≥a+b>0.

7. The rare earth based hydrogen storage alloy according to claim 2, wherein A=B=0, and c>0.

8. The rare earth based hydrogen storage alloy according to claim 7, wherein 3.5≥a+b≥0; and 3.0≥c>0.

9. The rare earth based hydrogen storage alloy according to claim 2, wherein 2.5≥A+B>0.

10. The rare earth based hydrogen storage alloy according to claim 9, wherein 12.5≥z≥11, and 4≥a+b>0.

11. The rare earth based hydrogen storage alloy according to claim 9, wherein 11>z≥9.5; 3.5≥a+b>0; and 3≥c≥0.

12. The rare earth based hydrogen storage alloy according to claim 9, wherein 9.5>z≥8.5; 3≥a+b>0; and 2.5≥c≥0.

13. The rare earth based hydrogen storage alloy according to claim 1, wherein one or more of the following items i)-iv) apply:

i) $2.0 \geq x \geq 0.5$;
ii) $3.0 \geq a \geq 0.5$;
iii) $1.5 \geq b \geq 0.3$;
iv) $z=11.4$.

14. The rare earth based hydrogen storage alloy according to claim 1, wherein one or more of the following items i)-iv) apply:
    i) $2.0 \geq x \geq 0.5$;
    ii) $2.5 \geq a \geq 0.5$;
    iii) $1.0 \geq b \geq 0.2$;
    iv) $z=10.5$.

15. The rare earth based hydrogen storage alloy according to claim 1, wherein one or more of the following items i)-iv) apply:
    i) $2.0 \geq x \geq 0.5$;
    ii) $2.0 \geq a \geq 0.5$;
    iii) $1.0 \geq b \geq 0.2$;
    iv) $z=9$.

16. The rare earth based hydrogen storage alloy according to claim 1, wherein one or more of the following items i)-v) apply:
    i) $2.0 \geq x \geq 0.5$;
    ii) $2.0 \geq a \geq 0.5$;
    iii) $1.0 \geq b \geq 0.3$;
    iv) $11.4 \geq z \geq 9$;
    v) $2.5 \geq c \geq 0.1$.

17. The rare earth based hydrogen storage alloy according to claim 1, wherein one or more of the following items i)-vii) apply:
    i) $2 \geq x \geq 0.5$;
    ii) $2.5 \geq a \geq 0.5$;
    iii) $1.0 \geq b \geq 0.2$;
    iv) $z=11.4$;
    v) $2.5 \geq c \geq 0.1$;
    vi) $1.0 \geq A \geq 0.1$;
    vii) $1.0 \geq B \geq 0.1$.

18. The rare earth based hydrogen storage alloy according to claim 1, wherein one or more of the following items i)-vii) apply:
    i) $2.0 \geq x \geq 0.5$;
    ii) $2.0 \geq a \geq 0.5$;
    iii) $1.0 \geq b \geq 0.2$;
    iv) $z=10.5$;
    v) $2.0 \geq c \geq 0.1$;
    vi) $1.0 \geq A \geq 0.1$;
    vii) $1.0 \geq B \geq 0.1$.

19. The rare earth based hydrogen storage alloy according to claim 1, wherein one or more of the following items i)-vii) apply:
    i) $2.0 \geq x \geq 0.5$;
    ii) $2.0 \geq a \geq 0.5$;
    iii) $1.0 \geq b \geq 0.2$;
    iv) $z=9$;
    v) $2.0 \geq c \geq 0.1$;
    vi) $1.0 \geq A \geq 0.1$;
    vii) $1.0 \geq B \geq 0.1$.

20. The rare earth based hydrogen storage alloy according to claim 1, wherein one or more of the following items i)-iii) apply:
    i) the alloy has a maximum hydrogen storage capacity of 1.2-1.5 wt % at 313K;
    ii) when utilized as a negative material electrode for a Ni-MH battery, the alloy has a maximum discharge capacity of 300-400 mAh/g at a current density of 70 mA/g;
    iii) the alloy has a capacity retention of more than 85%, at a current density of 70 mA/g.

21. A hydrogen storage medium comprising the rare earth based hydrogen storage alloy according to claim 1.

22. An electrode of a secondary battery comprising the rare earth based hydrogen storage alloy according to claim 1.

23. A secondary battery comprising the rare earth based hydrogen storage alloy according to claim 1.

* * * * *